US010469155B2

(12) United States Patent
Clarke et al.

(10) Patent No.: US 10,469,155 B2
(45) Date of Patent: *Nov. 5, 2019

(54) PROVISIONING MUTABLE SERVICE AREA WIRELESS NETWORK ACCESS

(71) Applicant: Cisco Technology, Inc., San Jose, CA (US)

(72) Inventors: Joseph Michael Clarke, Cary, NC (US); Gonzalo Salgueiro, Raleigh, NC (US); Charles Calvin Byers, Wheaton, IL (US); Ryan Steve D'Souza, San Jose, CA (US); Pascal Thubert, La Colle sur Loup (FR); Andre Jean-Marie Surcouf, St Leu la Foret (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,651

(22) Filed: Aug. 2, 2018

(65) Prior Publication Data
US 2019/0068275 A1 Feb. 28, 2019

Related U.S. Application Data

(63) Continuation of application No. 15/160,565, filed on May 20, 2016, now Pat. No. 10,056,964.

(51) Int. Cl.
*H04B 7/15* (2006.01)
*H04W 36/22* (2009.01)
(Continued)

(52) U.S. Cl.
CPC ........... *H04B 7/15* (2013.01); *H04B 7/15507* (2013.01); *H04B 7/2606* (2013.01);
(Continued)

(58) Field of Classification Search
None
See application file for complete search history.

(56) References Cited

U.S. PATENT DOCUMENTS

| 10,056,964 B2* | 8/2018 | Clarke | ..................... H04B 7/15 |
| 2003/0103470 A1* | 6/2003 | Yafuso | .................. H04L 1/0001 370/282 |

(Continued)

FOREIGN PATENT DOCUMENTS

EP 2938117 A1 10/2015

*Primary Examiner* — James P Duffy
(74) *Attorney, Agent, or Firm* — Behmke Innovation Group LLC; James Behmke; Stephen D. LeBarron

(57) ABSTRACT

Various implementations disclosed herein enable transforming mutable wireless coverage areas using network coverage vehicles (NVCs) that are orchestrated by a network coverage controller. In various implementations, the method includes receiving coverage area performance characterization values from NCVs configured to provide a plurality of mutable wireless coverage areas. In various implementations, an arrangement of the mutable wireless coverage areas mutably defines the service area, which changes in accordance with changes to the arrangement of the mutable wireless coverage areas. In various implementations, the method also includes determining NCV operation adjustments for some of the NCVs based on the received coverage area performance characterization values in accordance with a service performance metric; and, altering an arrangement of one or more of the plurality of mutable wireless coverage areas within the service area by providing the NCV operation adjustments to some of the NCVs.

20 Claims, 14 Drawing Sheets

(51) Int. Cl.
*H04B 7/155* (2006.01)
*H04B 7/26* (2006.01)
*H04W 24/02* (2009.01)
*H04W 40/04* (2009.01)
*H04W 88/08* (2009.01)
*H04W 84/12* (2009.01)

(52) U.S. Cl.
CPC ........... *H04W 24/02* (2013.01); *H04W 36/22* (2013.01); *H04W 40/04* (2013.01); *H04W 84/12* (2013.01); *H04W 88/08* (2013.01)

(56) References Cited

U.S. PATENT DOCUMENTS

| | | | |
|---|---|---|---|
| 2007/0177510 A1 | 8/2007 | Natarajan et al. | |
| 2012/0004001 A1* | 1/2012 | Power | H04W 24/02 455/507 |
| 2016/0363457 A1* | 12/2016 | Jelavic | H04W 4/90 |
| 2017/0019799 A1 | 1/2017 | Djordjevic et al. | |
| 2017/0092109 A1 | 3/2017 | Trundle et al. | |

\* cited by examiner

US 10,469,155 B2

PROVISIONING MUTABLE SERVICE AREA WIRELESS NETWORK ACCESS

CROSS REFERENCE TO RELATED APPLICATIONS

This application claims priority to U.S. patent application Ser. No. 15/160,565 filed on May 20, 2016, which is hereby incorporated by reference in its entirety.

TECHNICAL FIELD

The present disclosure generally relates to provisioning network access, and in particular, to providing flexible wireless coverage areas within a mutable service area.

BACKGROUND

The ongoing development of data networks often involves provisioning and improving connectivity in an ever widening range of service environments. For example, stadiums, convention centers and sprawling outdoor spaces (e.g., for festivals, concerts, rallies, sporting events, etc.) are particularly challenging venues for provisioning network access.

Venues of this type are typically characterized by a service area that can spread throughout large fields, parks, in and around stadiums, and/or within cavernous convention halls. It is difficult to provide reliable WiFi data networking or even cellular data networking within these types of service areas because of the transitory nature of pockets of high demand. The few cellular network base-stations close to such a venue are often overloaded by the density and volume of client devices that are carried by fluidly moving crowds. Prior solutions include erecting temporary WiFi access point towers (or poles) to increase coverage. But access point towers obstruct views and/or are hazards for large crowds that tend to move in unpredictable patterns—especially in emergencies. WiFi access point towers are also fixed in-place for the duration of an event, and cannot provide wireless coverage that tracks fluidly moving crowds and/or be moved to mitigate interference produced by temporary signal blockers, reflectors and/or environmental changes. Accordingly, provisioning WiFi coverage in this manner is undesirable because the placement of WiFi access point towers is difficult and cumbersome to change once an event starts. In order to move a WiFi access point tower a portion of an event space has to be cleared and the event disrupted—which is generally unacceptable to event organizers. So instead, previously available solutions rely on predicting the placement for WiFi access point towers before an event starts, which is difficult in view of the unpredictable nature of crowd movement. Additionally, there can be areas of IoT (Internet of Things) sensor deployment in these venues where providing terrestrial-based network coverage is problematic because of the lack of line-of-sight links to WiFi access point towers from sensors within the venue.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
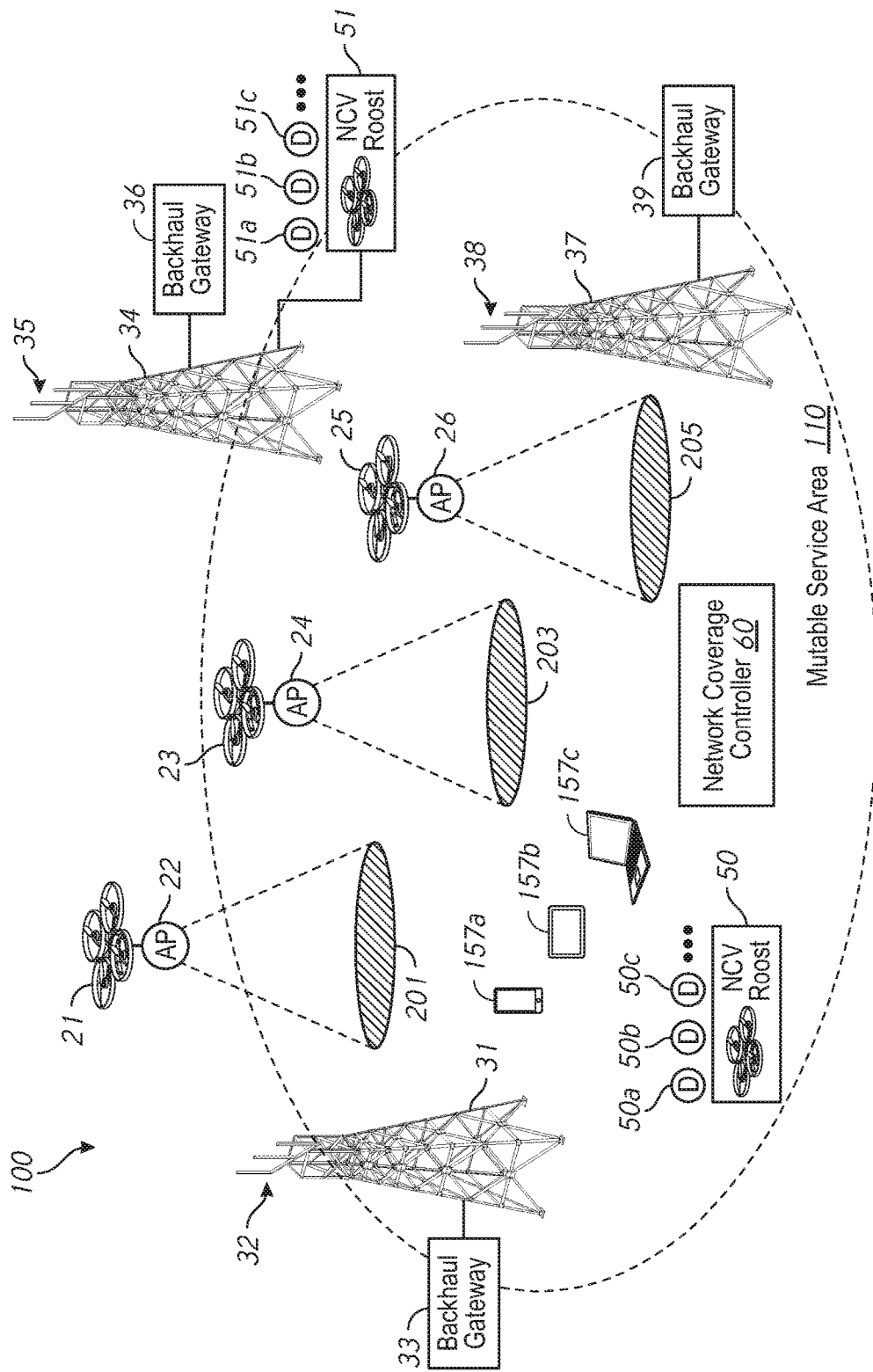
FIG. 1 is an illustration of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Using previously available solutions, sprawling event venues are typically serviced by temporarily erected WiFi access point towers. However, provisioning WiFi coverage in this manner is undesirable because the towers obstruct views, present potential safety hazards, and cannot be moved without disrupting an event. As such, previously available solutions rely on predicting a suitable placement for WiFi access point towers before an event starts, which is difficult in view of the unpredictable nature of crowd movement. As a result, poor coverage and performance is simply tolerated for the duration of the event. Additionally, providing terrestrial-based network coverage for IoT sensors and actuators is problematic because of a lack of line-of-sight links to WiFi access point towers from sensors within the venue.

By contrast, various implementations disclosed herein enable provisioning mutable wireless coverage areas using network coverage vehicles (NVCs) that are monitored and controlled by a network coverage controller. For example, in various implementations, a method of provisioning and transforming mutable wireless coverage areas within a service area is performed by a network coverage controller configured to transform a plurality of mutable wireless coverage areas within a service area. In various implementations, the method includes receiving coverage area performance characterization values from a plurality of NCVs that provide a corresponding plurality of mutable wireless coverage areas within a service area, wherein each NCV includes an access point and a directed navigation system. Each access point on a NCV is configured to provide a respective one of the plurality of mutable wireless coverage areas. In various implementations, an arrangement of the mutable wireless coverage areas mutably defines the service area, which changes in accordance with changes to the arrangement of the mutable wireless coverage areas. In various implementations, the method also includes determining NCV operation adjustments for some of the plurality of NCVs based on the received coverage area performance characterization values in accordance with a service performance metric; and, altering an arrangement of one or more of the plurality of mutable wireless coverage areas within the service area by providing the NCV operation adjustments to some of the plurality of NCVs.

FIG. 1 is an illustration of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a network coverage controller 60, backhaul access point towers 31, 34, 37, backhaul access points (APs) 32, 35, 38, backhaul gateway nodes 33, 36, 39 and NCV roosts 50, 51. While FIG. 1 includes a particular number of the aforementioned elements, those of ordinary skill in the art will appreciate from the present disclosure that any number of aforementioned elements are included in various implementations.

In various implementations, the backhaul access point towers 31, 34, 37 provide elevated mounting positions for the corresponding backhaul APs 32, 35, 38, preferably around the perimeter of the service area 110, in order to provide improved line-of-sight links to NCVs 21, 23, 25 without encumbering the inner space of the service area 110. In various implementations one or more backhaul APs are also mounted on existing structures (e.g. buildings, bridges, etc.) and corresponding backhaul access point towers may not be used. In various implementations, the corresponding backhaul APs 32, 35, 38 are configured to establish wireless communication links with APs carried by the NCVs. As such, in various implementations, in order to judiciously utilize RF spectrum bandwidth, backhaul APs 32, 35, 38 are not permitted to use WiFi channels and are also not permitted to establish direct communication channels with client devices, such as the smartphone 157a, the tablet computing device 157b, and the laptop computer 157c. In some implementations, the backhaul APs 32, 35, 38 use a reserved subset of WiFi channels in order to communicate with NCVs, and client devices are not permitted access to the reserved subset of WiFi channels.

The backhaul gateway nodes 33, 36, 39 provide communication channels for client data traffic to and from various private and/or public networks (e.g., the Internet) from and to the service area 110. In various implementations, the backhaul gateway nodes 33, 36, 39 are correspondingly coupled to the backhaul APs 32, 35, 38. In some implementations, one or more couplings includes a cable (e.g., Ethernet, fiber, etc.) link between a backhaul gateway node and a respective backhaul AP. Other than providing communication channels for client data traffic, an exhaustive description of the numerous examples of backhaul gateway nodes 33, 36, 39 are not particularly pertinent to the scope of the present disclosure. As such, no further details pertaining to the backhaul gateway nodes 33, 36, 39 are provided for the sake of brevity. In some implementations, a backhaul gateway node is provided as a single entity (e.g., a server, a virtual machine, etc.). In some implementations, a backhaul gateway node includes a distributed system including a suitable combination of software, data structures, virtual machines, computing devices, servers, switches and routers, as beneficial to provide local computation, networking and storage capabilities. Merely for the sake of brevity and convenience of explanation, each of the backhaul gateway nodes 33, 36, 39 are described herein as a single entity.

In various implementations, as described in more detail with reference to the examples below, the network coverage controller 60 is configured to provision and adaptively transform a plurality of mutable wireless coverage areas within a service area. Briefly, for example, in various implementations, the network coverage controller 60 is configured to receive coverage area performance characterization values from NCVs, determine NCV operation adjustments based on the received coverage area performance characterization values, and alter an arrangement of the mutable wireless coverage areas by providing the NCV operation adjustments to the NCVs. More specific examples of the operation of the network coverage controller 60 are described below with reference to FIGS. 2 to 11B.

Figure 13:
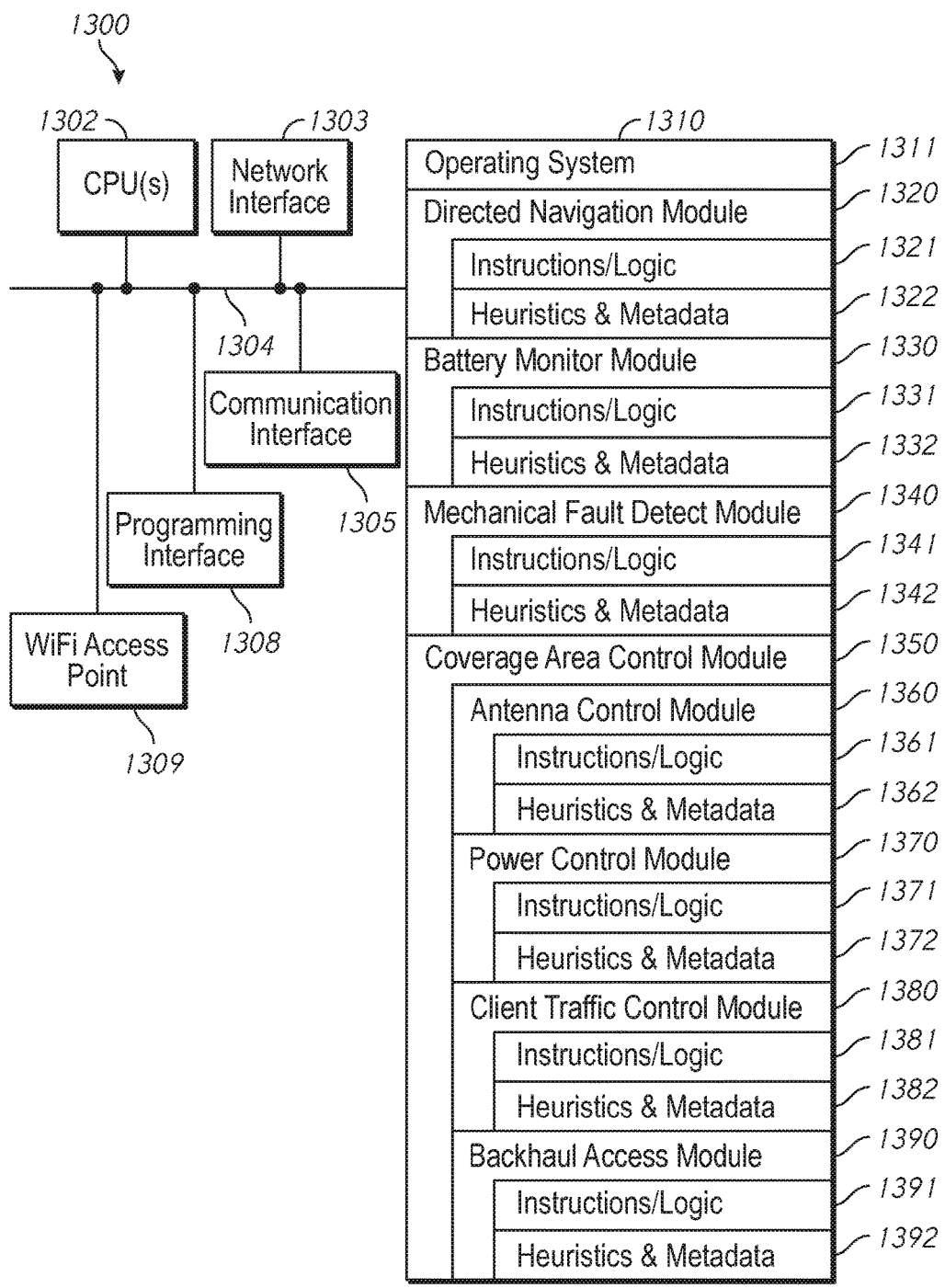
FIG. 13 is a block diagram of a network coverage vehicle in accordance with some implementations.

In various implementations, each of the NCVs 21, 23, 25 include a corresponding AP 22, 24, 26 and a corresponding directed navigation system (See, FIG. 13). In operation, the NCVs 21, 23, 25—by way of the APs 22, 24, 26—provide corresponding mutable wireless coverage areas 201, 203, 205 within the service area 110. More specifically, with reference to FIG. 1, the AP 22 of NCV 21 provides mutable wireless coverage area 201 within the service area 110, the AP 24 of NCV 23 provides mutable wireless coverage area 203, and the AP 26 of NCV 25 provides mutable wireless coverage area 205.

In various implementations, the NCV roosts 50, 51 provide local collection points for NCVs, where NCVs can be stored, recharged, tested and/or serviced during an event. For example, as shown in FIG. 1, the NCV roost 50 is associated with stored NCVs 50a, 50b, 50c, and the NCV roost 51 is associated with stored NCVs 51a, 51b, 51c. A NCV roost can be collocated with a backhaul AP tower or another fixed asset, such as NCV roost 51 which is proximate to the backhaul tower 34. Additionally and/or alternatively, a NCV roost can be located independent of other fixed assets, such as NCV 50.

A number of client devices are also shown for example, such as a smartphone 157a, a tablet computing device 157b, and a laptop computer 157c. For the sake of brevity, in some of the examples described below, the smartphone 157a, the tablet computing device 157b, and the laptop computer 157c are also referenced collectively hereinafter as client devices 157. Moreover, as with the other elements shown in FIG. 1, those of ordinary skill in the art will appreciate that any number of client devices 157 may be used in combination the data networking environment 100 in accordance with various implementations. Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. Client devices 157 could also include Internet of Things sensors and actuators used to monitor and control the venue of the mutable service area 110. In some implementations, each client device (e.g., smartphone 157a, tablet device 157b, laptop 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

Figure 2:
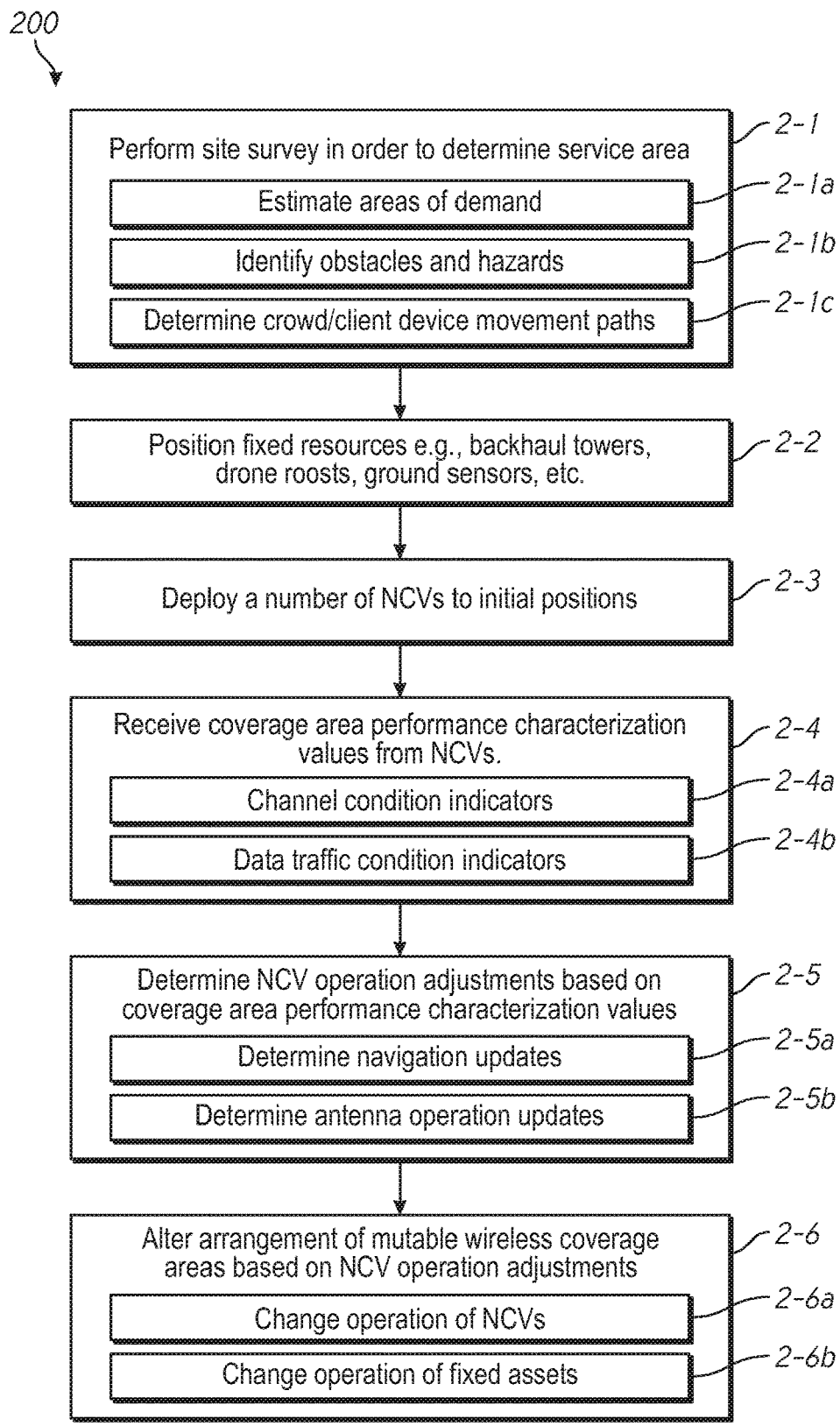
FIG. 2 is a flowchart representation of a method of provisioning and transforming mutable wireless coverage areas within a mutable service area in accordance with some implementations.

FIG. 2 is a flowchart representation of a method 200 of provisioning and transforming mutable wireless coverage areas within a service area according to some implementations. In various implementations, the method 200 is performed by a network coverage controller (e.g., the network coverage controller 60 of FIG. 1) configured to transform mutable wireless coverage areas provided by NCVs (e.g., the NCVs 21, 23, 25 of FIG. 1), and which includes a non-transitory memory, one or more processors, and various network interfaces. Those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 200 are described herein with reference to FIG. 1. In various implementations, an arrangement of the mutable wireless coverage areas mutably defines a mutable service area, which is transformable by changing the arrangement of the mutable wireless coverage areas. Briefly, the method 200 includes receiving feedback from a number of NCVs, determining NCV operation adjustments using the received feedback, and changing the mutable wireless coverage areas by effectuating the NCV operation adjustments.

To that end, as represented by block 2-1, in some implementations the method 200 includes performing a site survey in order to determine an initial service area for an event space or another type of temporary space (e.g., an emergency camp, field hospital, etc.). For example, with reference to FIG. 1, performing a site survey produces mutable service area 110 spanning an initial space. In some implementations, as represented by block 2-1a, performing a site survey in order to determine an initial service area includes estimating areas of high and low demand within an event space. For example, within a sports stadium, areas of high demand include seating areas during a sporting event, and parking lots prior to the beginning of the sporting event (e.g., for tailgating), which may then become areas of low demand during the sporting event. In some implementations, as represented by block 2-1b, performing a site survey in order to determine an initial service area includes identifying obstacles and hazards within and proximate to the event space. For example, obstacles and hazards include temporary or permanent structures, buildings, trees, bodies of water, roadways, and other potential sources of radio interference, etc. In some implementations, as represented by block 2-1c, performing a site survey in order to determine an initial service area includes determining crowd movement paths. For example, within a festival venue, determining crowd movement paths includes identifying how and/or when attendees move between performance stages and pre-planned attractions or displays.

As represented by block 2-2, in some implementations the method 200 includes positioning fixed network resources around the service area. For example, with reference to FIG. 1, positioning fixed network resources around the service area 110 includes positioning backhaul access point towers 31, 34, 37 (along with corresponding backhaul APs 32, 35, 38), and the NCV roosts 50, 51 around the perimeter of the service area 110, thereby allowing the central portion of the service area to be free from encumbrances and hazards caused by fixed network resources. Similarly, positioning fixed network resources around the service area 110 also includes positioning the network coverage controller 60 in and/or around the service area 110. In some implementations, the network coverage controller 60 is co-located with one of the backhaul access point towers 31, 34, 37, and the NCV roosts 50, 51 (or other fixed network resources). In some implementations, the network coverage controller 60 is placed independently of other fixed network resources. In some implementations, the network coverage controller is in close physical proximity to mutable service area 110 in order to reduce latency, increase interconnect bandwidth, and improve the reliability of connections to the resources of system 100. In some implementations, the network coverage controller 60 is implemented remotely as a cloud-hosted system.

As represented by block 2-3, in some implementations the method 200 includes deploying a number of NCVs to initial positons within the service area. As noted above, each NCV includes a respective wireless access point that is configured to provide a mutable wireless coverage area within a service area managed by a network coverage controller. For example, with reference to FIG. 1, the AP 22 of NCV 21 provides mutable wireless coverage area 201 within the service area 110, the AP 24 of NCV 23 provides mutable wireless coverage area 203, and the AP 26 of NCV 25 provides mutable wireless coverage area 205. In some implementations, deploying a number of NCVs to initial positons includes deploying an initial set of NCVs proximate to the time an event begins (e.g., before the event starts to provide event staff with network access as the service area is being prepared for the event). In some implementations, deploying a number of NCVs to initial positons includes deploying additional numbers of NCVs in order to accommodate increases in network demand from client devices that are brought into the service area proximate to the time that the event begins. In various implementations, determining initial positions of the NCVs is based on expected density of client devices, estimated network bandwidth requirements of the client device, and interfering obstacles (as described above).

As represented by block 2-4, in some implementations the method 200 includes receiving coverage area performance characterization values from the NCVs deployed within the service area. For example, with reference to FIG. 1, the network coverage controller 60 receives one or more coverage area performance characterization values from each of NCVs 21, 23, 25 from within the mutable service area 110. In some implementations, as represented by block 2-4a, one or more of the coverage area performance characterization values includes a value that characterizes a wireless channel condition within a corresponding one of the mutable wireless coverage areas provided by the NCVs. For example, the value includes one of an interference estimate, a signal-to-noise ratio, and a fading estimate of channel conditions within a respective mutable wireless coverage area, and/or any other channel condition characterization value know to those of ordinary skill in the art. For example, with reference to FIG. 1, the network coverage controller 60 receives one or more co-channel interference estimates from NCV 21 that characterize co-channel interference within mutable wireless coverage area 201 as measured by and/or reported to NCV 21. In some implementations, as represented by block 2-4b, one or more of the coverage area performance characterization values provided by a NCV includes a value that characterizes a data traffic condition within a corresponding respective mutable wireless coverage area. In some implementations, the value includes one of bandwidth demand from client devices, bandwidth utilization on a per client basis, aggregate bandwidth utilization provided by the one of the plurality of NCVs, a congestion indicator estimate relative to the one of the plurality of NCVs, density of client devices within a corresponding one of the plurality mutable wireless coverage areas, an expected latency that includes the time for channel access (expressing contention) and for ARQ (expressing transmission loss), the number of client devices serviced at an acceptable level per NCV. Also in block 2-4B, in some implementations, the backhaul bandwidth utilization between NCVs and backhaul towers is reported. For example, with reference to FIG. 1, the network coverage controller 60 receives channel bandwidth utilization estimates from NCV 23 that characterize how client devices receiving network access through NCV 23 are using allocated bandwidth from the AP 24, and also how NCV 23 is using backhaul bandwidth (for example connecting to backhaul AP 35).

As represented by block 2-5, in some implementations the method 200 includes determining NCV operation adjustments for at least some of the NCVs based on the received coverage area performance characterization values in accordance with a service performance metric. In various implementations, service performance metrics include examples such as a bandwidth utilization range target, a tolerable discrepancy for tracking demand changes, an interference target value, a latency target value, a packet drop rate threshold, a co-channel interference threshold, broadcast statistics, location accuracy metric, security setting, and coverage measurements at multiple locations within the mutable service area 110. In various implementations, service performance metrics are provided to assess and adjust coverage to as many client devices within the mutable service area as possible, and so that each client device receives an adequate level of service corresponding to a service level agreement (SLA) or the like. For example, if an SLA guarantees a certain bandwidth to a premium user, an NCV may be dispatched near enough to provide that bandwidth. As such, one such service performance metric is a lower bound throughput for that user and/or users of a particular SLA level. This may have the consequence of depriving lower-end users for a period of time. An aging mechanism may additionally be put in place to avoid depriving lower-end users too long. In another example between users of the same SLA level, an NCV may navigate so as to find a barycenter where multiple users are fairly served, none getting perfect throughput but all getting some relatively fair amount. This does not mean that all potential users are served. As such, a service performance metric includes a number of users that can be served above a threshold service bar. In some implementations, as represented by block 2-5a, determining NCV operation adjustments includes generating a respective set of navigation updates for at least one of a number of NCVs. The respective set of navigation updates includes instructions directing at least a corresponding one of the NCVs to a new position in order to alter the arrangement of one or more the mutable wireless coverage areas within the service area. More detailed examples of generating and providing navigation updates are described below with reference to FIGS. 3, 5, and 10. In some implementations, as represented by block 2-5b, determining NCV operation adjustments includes generating antenna operation adjustments for at least one of a number of NCVs. In various implementations, the antenna operation adjustments include a combination of one or more of an antenna transmission power control adjustment, an antenna repositioning adjustment, enabling the use of an additional antenna, and disabling the use of an antenna currently in use in order to alter arrangement of one or more the mutable wireless coverage areas within the service area. A more detailed example of generating and providing antenna operation adjustments are described below with reference to FIG. 3.

As represented by block 2-6, in some implementations the method 200 includes altering an arrangement of one or more mutable wireless coverage areas within the service area by providing the NCV operation adjustments to at least some of the plurality of NCVs. In some implementations, as represented by block 2-6a, altering an arrangement of one or more mutable wireless coverage areas includes changing the operation of NCVs. More detailed examples of changing the operation of NCVs are described below with reference to FIGS. 3, 5, 6, and 10. In some implementations, as represented by block 2-6b, altering an arrangement of one or more mutable wireless coverage areas includes changing the operation of fixed network assets (e.g., backhaul gateway nodes 33, 36, 39). A more detailed example of generating and providing antenna operation adjustments are described below with reference to FIG. 9.

Figure 3:
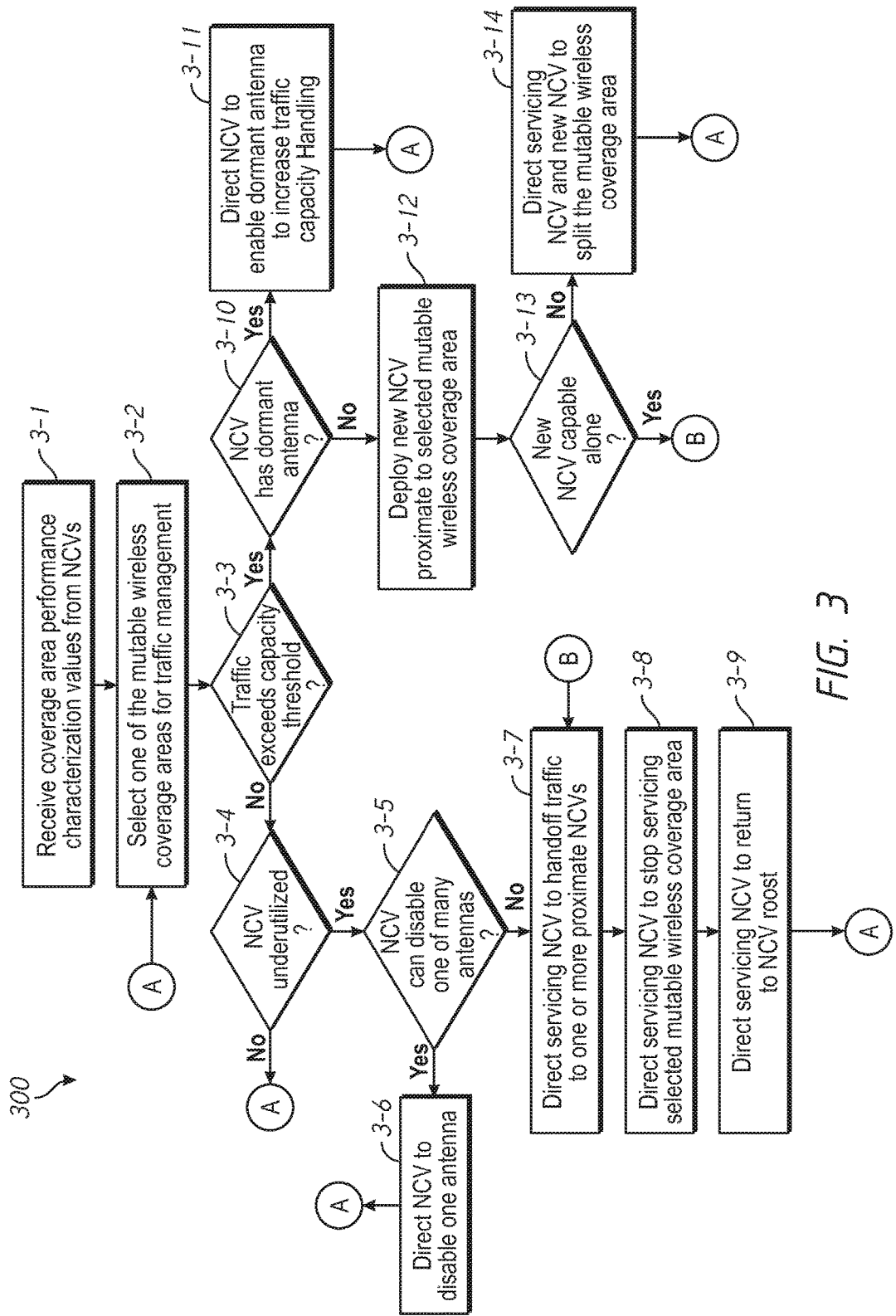
FIG. 3 is a flowchart representation of another method of provisioning and transforming mutable wireless coverage areas within a mutable service area in accordance with some implementations.

FIG. 3 is a flowchart representation of a method 300 of provisioning and transforming mutable wireless coverage areas within a service area in accordance with some implementations. In various implementations, the method 300 is performed by a network coverage controller (e.g., the network coverage controller 60 of FIG. 1) configured to transform mutable wireless coverage areas provided by NCVs (e.g., the NCVs 21, 23, 25 of FIG. 1). Again, those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 300 are described herein with reference to FIGS. 1 and 4.

Figure 4:
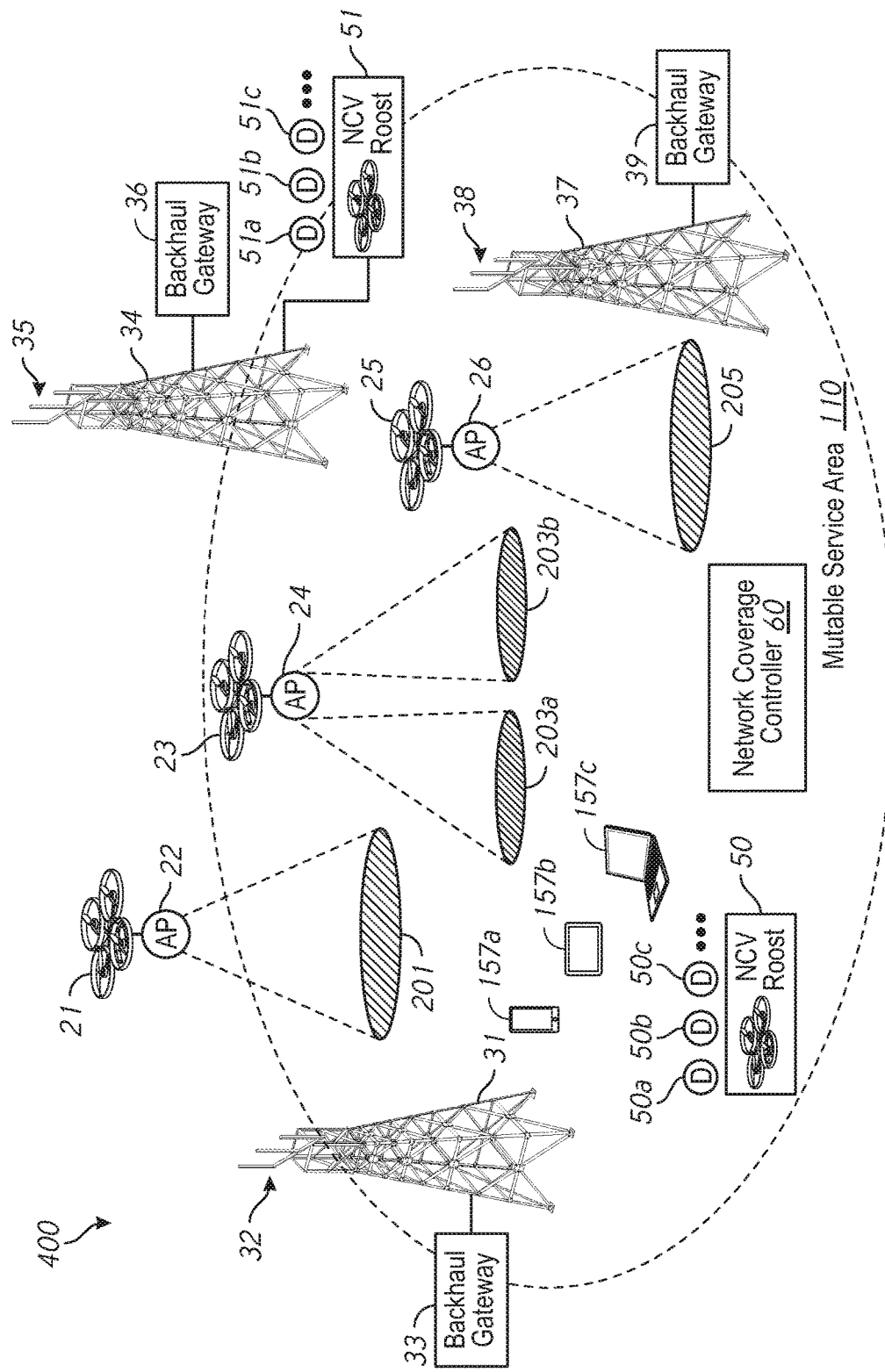
FIG. 4 is an illustration of the data networking environment adapted from FIG. 1 in accordance with some implementations.

Data networking environment 400 shown in FIG. 4 is similar to and adapted from the data networking environment 100 shown in FIG. 1. Elements common to FIGS. 1 and 4 include common reference numbers, and only the differences between FIGS. 1 and 4 are described herein for the sake of brevity.

Briefly, the method 300 includes receiving feedback from a number of NCVs, determining NCV operation adjustments based on the received feedback, and changing the mutable wireless coverage areas by effectuating the NCV operation adjustments. In various implementations, NCV operation adjustments include adjusting antenna operation of a NCV, repositioning of a NCV, collapsing a mutable wireless coverage area by removing a NCV from the service area, and adding a mutable wireless coverage area by adding a NCV.

To that end, as represented by block 3-1, in some implementations the method 300 includes receiving coverage area performance characterization values from the NCVs deployed within the service area. For example, with reference to FIG. 1, the network coverage controller 60 receives one or more coverage area performance characterization values from each of the NCVs 21, 23, 25 which respectively provide the mutable wireless coverage areas 201, 203, 205 (using corresponding APs). As represented by block 3-2, in some implementations, the method 300 includes selecting one of the mutable wireless coverage areas for traffic management evaluation. As an example, with reference to FIG. 1, the method includes selecting the mutable wireless coverage area 203, serviced by the NCV 23. As shown in FIG. 4, the NCV 23 provides the mutable wireless coverage area 203 by providing two mutable sub-coverage areas 203a, 203b. The two mutable sub-coverage areas 203a, 203b are provided by corresponding first and second antenna assemblies (not shown) included with AP 24, and/or by using beam forming techniques from an antenna array associated with AP 24, along with associated radio resources for each of the first and second antennas.

As represented by block 3-3, in some implementations the method 300 includes determining whether or not the data traffic serviced by the NCV, within the selected mutable wireless coverage area, exceeds a capacity threshold level. In other words, the method 300 includes determining whether or not a NCV is experiencing bandwidth demand from client devices that is coming close to exhausting the bandwidth that can be provided by that NCV in its current configuration or mode of operation.

If the capacity threshold has not been exceeded ("No" path from block 3-3), as represented by block 3-4, in some implementations, the method 300 includes determining whether or not the bandwidth provided by the NCV is underutilized in its current configuration—indicating a lack of demand from client devices in the selected mutable wireless coverage area. If the bandwidth provided by the NCV is not underutilized ("No" path from block 3-4), the method 300 circles back to the portion of the method represented by block 3-2 in order to evaluate another mutable wireless coverage area.

On the other hand, if the bandwidth provided by the NCV is underutilized ("Yes" path from block 3-4), as represented by block 3-5, in some implementations the method 300 includes assessing the NCV antenna configuration in order to determine if the NCV is operating inefficiently by providing excess capacity. In other words, the method 300 includes determining whether or not the NCV can disable an antenna and associated communication modules (e.g., RF radio) and/or reconfigure a beam forming system in order to reduce the bandwidth to client device available from the NCV. Continuing the example above, with reference to FIGS. 1 and 4, determining whether or not the NCV 23 is underutilized includes assessing whether to not the corresponding AP 24 is operating radio resources inefficiently by providing significantly more bandwidth than is being demanded by client devices. If the NCV can disable an antenna and the associated radio resources ("Yes" path from block 3-5), as represented by block 3-6, in some implementations the method 300 includes directing the NCV to reduce the bandwidth being provided to the selected mutable wireless coverage area by disabling at least one of the antennas and/or removing at least one lobe from its beam forming system. Continuing the example, with reference to FIG. 4, the network coverage controller 60 directs the NCV 23 to disable the second antenna and the associated radio resources operated by the AP 24. Subsequently, the mutable wireless coverage area 203 is then serviced by the remaining first antenna of the NCV 23 as shown in FIG. 1. In some implementations, the area covered by the mutable wireless coverage area 203 may be physically smaller after the second antenna is disabled, and the sub-coverage area 203b is collapsed.

On the other hand, if the NCV cannot disable an antenna in order to reduce available bandwidth ("No" path from block 3-5), the method 300 includes initiating a process to disable the NCV and remove the NCV from the service area. In some instances, an NCV may be only operating a single antenna and/or beam forming lobe, and disabling that one antenna will collapse the mutable wireless coverage area. As such, the process to disable and remove the NCV is preferred because removing the NCV may reduce wear-and-tear on the NCV, which may also extend the life of the NCV, and will save energy. To that end, as represented by block 3-7, in some implementations the method 300 includes directing the NCV to handoff the remaining traffic that the NCV is handling to one or more proximate NCVs. As represented by block 3-8, in some implementations the method 300 includes directing the NCV to stop servicing the selected mutable wireless coverage area. As represented by block 3-9, in some implementations the method 300 includes directing the NCV to return to a NCV roost. For example, with reference to FIG. 4, the network coverage controller 60 directs the NCV 23 to handoff traffic to NCVs 21 and 25, and then return to the NCV roost 50. Taken together, the portions of the method 300 represented by block 3-7 to 3-9 comprise a process for collapsing a mutable wireless coverage area in response to determining that demand for bandwidth from client devices within that mutable wireless coverage area falls below a threshold traffic demand level.

Returning again to block 3-3, if the capacity threshold has been exceeded ("Yes" path from block 3-3), as represented by block 3-10, in some implementations, in some implementations the method 300 includes assessing the NCV antenna configuration in order to determine if the NCV is capable of enabling additional capacity. More specifically, the method 300 includes determining whether or not the NCV is capable of enabling an antenna and associated communication modules (e.g., RF radio) and/or or creating additional beam forming lobes in order to increase the bandwidth available from the NCV. If the NCV is capable of enabling an additional antenna in order to increase capacity ("Yes" path from block 3-10), as represented by block 3-11, in some implementations the method 300 includes directing the NCV to enable a dormant antenna in order to increase available bandwidth. For example, with reference FIG. 1, if the mutable wireless coverage area 203 is being provided by a first antenna of the AP 24, while a second antenna is dormant/disabled, extra capacity can be provided by enabling the second antenna. In such circumstances, the network coverage controller 60 directs the NCV 23 to enable the second antenna of AP 24. Then, as shown in FIG. 4, the NCV 23 provides the mutable wireless coverage area 203 by providing two mutable sub-coverage areas 203a, 203b by using both the first and second antennas of AP 24.

On the other hand, if the NCV is not capable of enabling an additional antenna ("No" path from block 3-10), as represented by block 3-12, in some implementations the method 300 includes deploying a new NCV proximate to the selected mutable wireless coverage area. For example, with reference to FIGS. 1 and 4, the network coverage controller 60 deploys NCV 50c, initially located at NCV roost 50, to a space proximate to the NCV 23 in order to provide bandwidth to client devices that are being serviced by NCV 23. As represented by block 3-13, in some implementations the method 300 includes determining whether or not the newly deployed NCV is capable of servicing all of the traffic in the selected mutable wireless coverage area. If the newly deployed NCV is capable of servicing all of the traffic in the selected mutable wireless coverage area ("Yes" path from block 3-13), in some implementations the method 300 includes removing the servicing NCV from the service area and allowing the newly deployed NCV to take over. To that end, in some implementations, the method proceeds to the portion of the method represented by block 3-7 in order to remove the servicing NCV. On the other hand, if the newly deployed NCV is not capable of servicing all of the traffic in the selected mutable wireless coverage area ("No" path from block 3-13), as represented by block 3-14, in some implementations the method 300 includes directing the servicing NCV and the newly deployed NCV to split the selected mutable wireless coverage area into two mutable wireless coverage areas that can be managed independently or cooperatively. In some cases, two or more mutable coverage areas may partly or completely physically overlap. So long as the multiple NCVs servicing the overlapping areas coordinate channel utilization to avoid conflicts, additional network capacity in the areas of overlap may be achieved.

Figure 5:
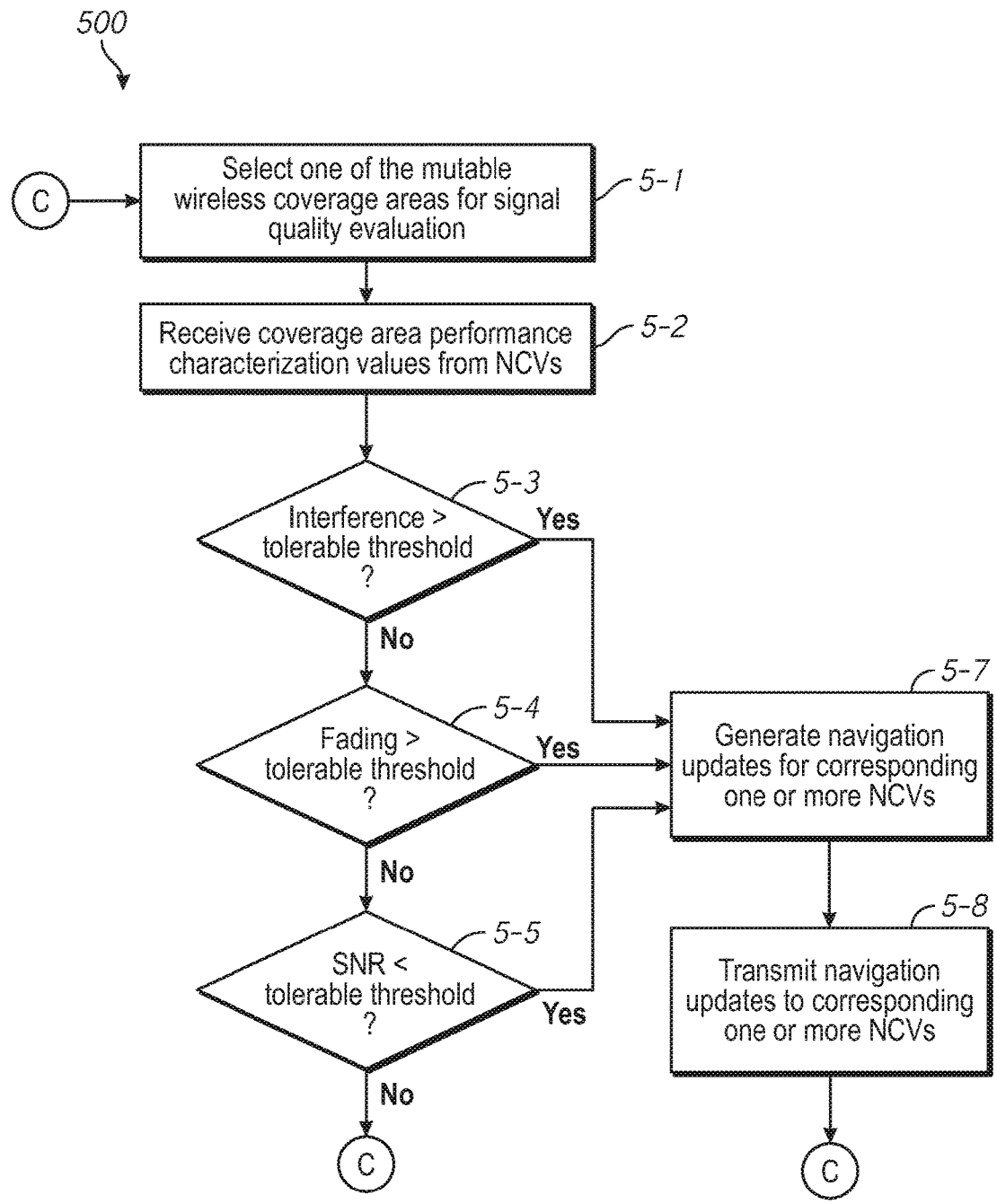
FIG. 5 is a flowchart representation of another method of provisioning and transforming mutable wireless coverage areas within a mutable service area in accordance with some implementations.
Figure 6:
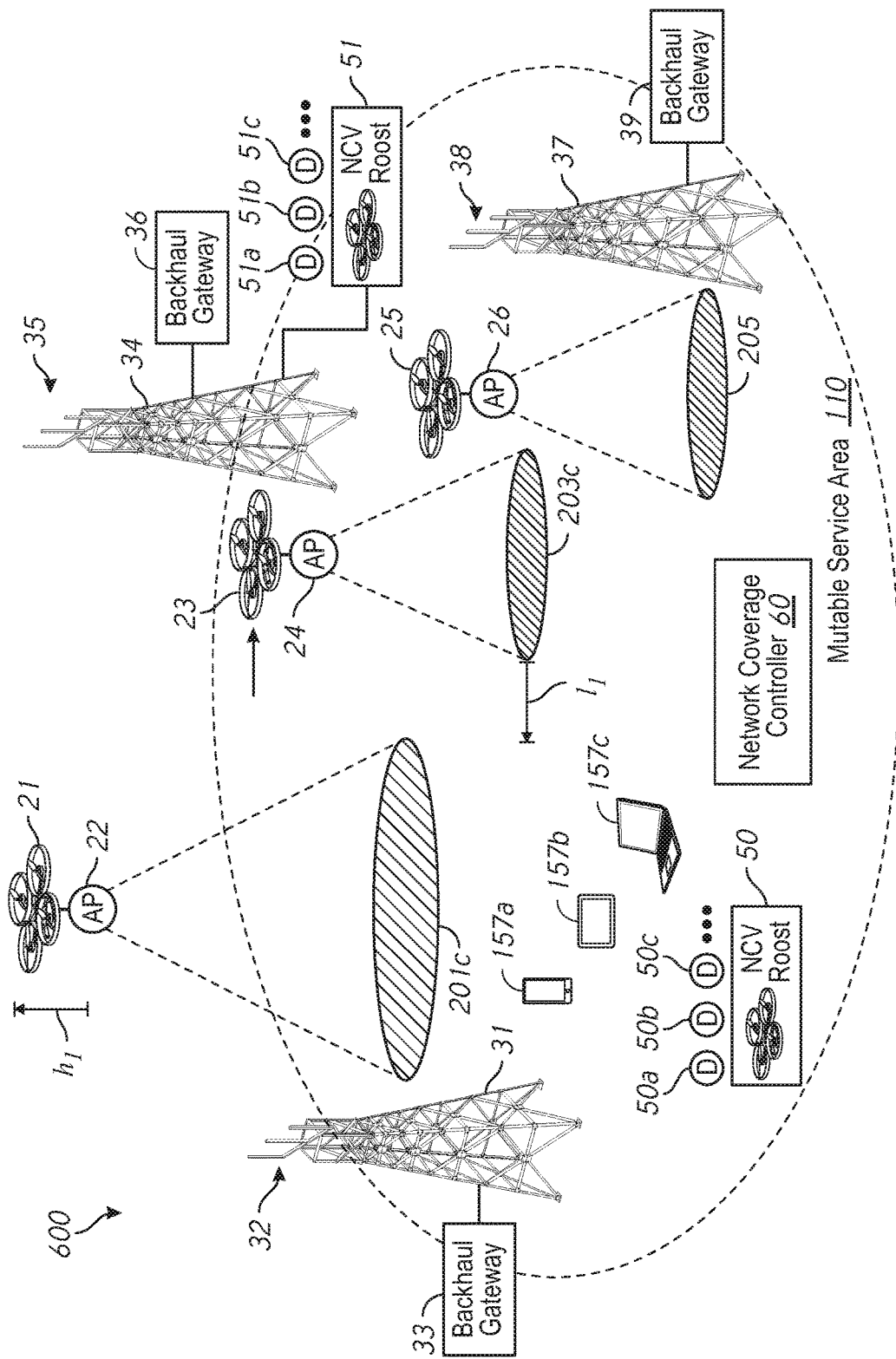
FIG. 6 is an illustration of the data networking environment adapted from FIG. 1 in accordance with some implementations.

FIG. 5 is a flowchart representation of a method 500 of provisioning and transforming mutable wireless coverage areas within a service area in accordance with some implementations. In various implementations, the method 500 is performed by a network coverage controller (e.g., the network coverage controller 60 of FIG. 1) configured to transform mutable wireless coverage areas provided by NCVs (e.g., the NCVs 21, 23, 25 of FIG. 1). Again, those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 500 are described herein with reference to FIGS. 1 and 6. Data networking environment 600 shown in FIG. 6 is similar to and adapted from the data networking environment 100 shown in FIG. 1. Elements common to FIGS. 1 and 6 include common reference numbers, and only the differences between FIGS. 1 and 6 are described herein for the sake of brevity.

Briefly, the method 500 includes evaluating channel quality and/or signal quality associated with wireless links to and/or from a NCV within a particular mutable wireless coverage area, and adjusting the position of one or more NCVs in order to satisfy one or more performance metrics. As represented by block 5-1, in some implementations the method 500 includes receiving coverage area performance characterization values from the NCVs deployed within the service area. For example, with reference to FIG. 1, the network coverage controller 60 receives one or more coverage area performance characterization values from each of NCVs 21, 23, 25 which respectively provide the mutable wireless coverage areas 201, 203, 205. As represented by block 5-2, in some implementations, the method 500 includes selecting one of the mutable wireless coverage areas for channel quality and/or signal quality evaluation. For example, with reference to FIG. 1, the method includes selecting the mutable wireless coverage area 203, which serviced by the NCV 23.

As represented by block 5-3, in some implementations the method 500 includes determining whether or not interference within the selected mutable wireless coverage area breaches a tolerable interference threshold. As noted above, in various implementations, the coverage area performance characterization values provided by the NCV associated with the selected mutable wireless coverage area include one or more interference estimate values (e.g., specified by type of interference and magnitude). For example, with reference to FIG. 1, the network coverage controller 60 receives one or more interference estimate values from the NCV 23. If a reported level of interference breaches a respective tolerable interference threshold ("Yes" path from block 5-3), as represented by block 5-7, in some implementations the method 500 includes generating navigation updates for a corresponding one or more NCVs, including the NCV associated with the selected mutable wireless coverage area. In various implementations, the navigation updates are generated in order to reposition at least the NCV associated with the selected mutable wireless coverage area so that the channel quality and/or signal quality within the selected mutable wireless coverage area improves.

On the other hand, if the reported level of interference does not breach the respective tolerable interference threshold ("No" path from block 5-3), as represented by block 5-4, in some implementations the method 500 includes assessing signal fading in the selected mutable wireless coverage area. More specifically, in some implementations, the method 500 includes determining whether or not signal a type of fading (e.g., Rayleigh, Nakagami, Rician, etc.) within the selected mutable wireless coverage area breaches a tolerable fading threshold. As noted above, in various implementations, the coverage area performance characterization values provided by the NCV associated with the selected mutable wireless coverage area include one or more fading estimate values. For example, with reference to FIG. 1, the network coverage controller 60 receives one or more fading estimate values from the NCV 23. If a reported level of signal fading breaches a respective tolerable fading threshold ("Yes" path from block 5-4), as represented by block 5-7, in some implementations the method 500 includes generating navigation updates for a corresponding one or more NCVs, including the NCV associated with the selected mutable wireless coverage area. As noted above, in various implementations, the navigation updates are generated in order to reposition at least the NCV associated with the selected mutable wireless coverage area so that the channel quality and/or signal quality within the selected mutable wireless coverage area improves.

On the other hand, if the reported level of signal fading does not breach the respective tolerable fading threshold ("No" path from block 5-4), as represented by block 5-5, in some implementations the method 500 includes assessing the signal-to-noise ratio (SNR) in the selected mutable wireless coverage area. More specifically, in some implementations, the method 500 includes determining whether or not the SNR within the selected mutable wireless coverage area breaches a tolerable SNR threshold. In various implementations, the coverage area performance characterization values provided by the NCV associated with the selected mutable wireless coverage area include one or more SNR estimate values. For example, with reference to FIG. 1, the network coverage controller 60 receives one or more SNR estimate values from the NCV 23. If the reported SNR breaches a respective tolerable SNR threshold ("Yes" path from block 5-5), as represented by block 5-7, in some implementations the method 500 includes generating navigation updates for a corresponding one or more NCVs, including the NCV associated with the selected mutable wireless coverage area. As noted above, in various implementations, the navigation updates are generated in order to reposition at least the NCV associated with the selected mutable wireless coverage area so that the channel quality and/or signal quality within the selected mutable wireless coverage area improves. On the other hand, if the reported SNR does not breach the respective tolerable SNR threshold ("No" path from block 5-5), the method 500 circles back to the portion of the method represented by block 5-1 in which a new mutable wireless coverage area is selected.

Following block 5-7, as represented by block 5-8, in some implementations the method 500 includes transmitting navigation updates to one or more of the NCVs in the service area—including the NCV associated with the selected mutable wireless coverage area. The navigation updates direct the receiving NCVs to reposition in order improve channel quality and/or signal quality. For example, with reference to FIGS. 1 and 6, the network coverage controller 60 directs the NCV 23 to reposition laterally along path $l_1$, thereby transforming mutable wireless coverage area 203 (of FIG. 1) to 203c (of FIG. 6). In other example, with reference to FIGS. 1 and 6, the network coverage controller 60 directs the NCV 21 to reposition vertically along path $h_1$, thereby transforming mutable wireless coverage area 201 (of FIG. 1) to 201c (of FIG. 6).

Figure 7:
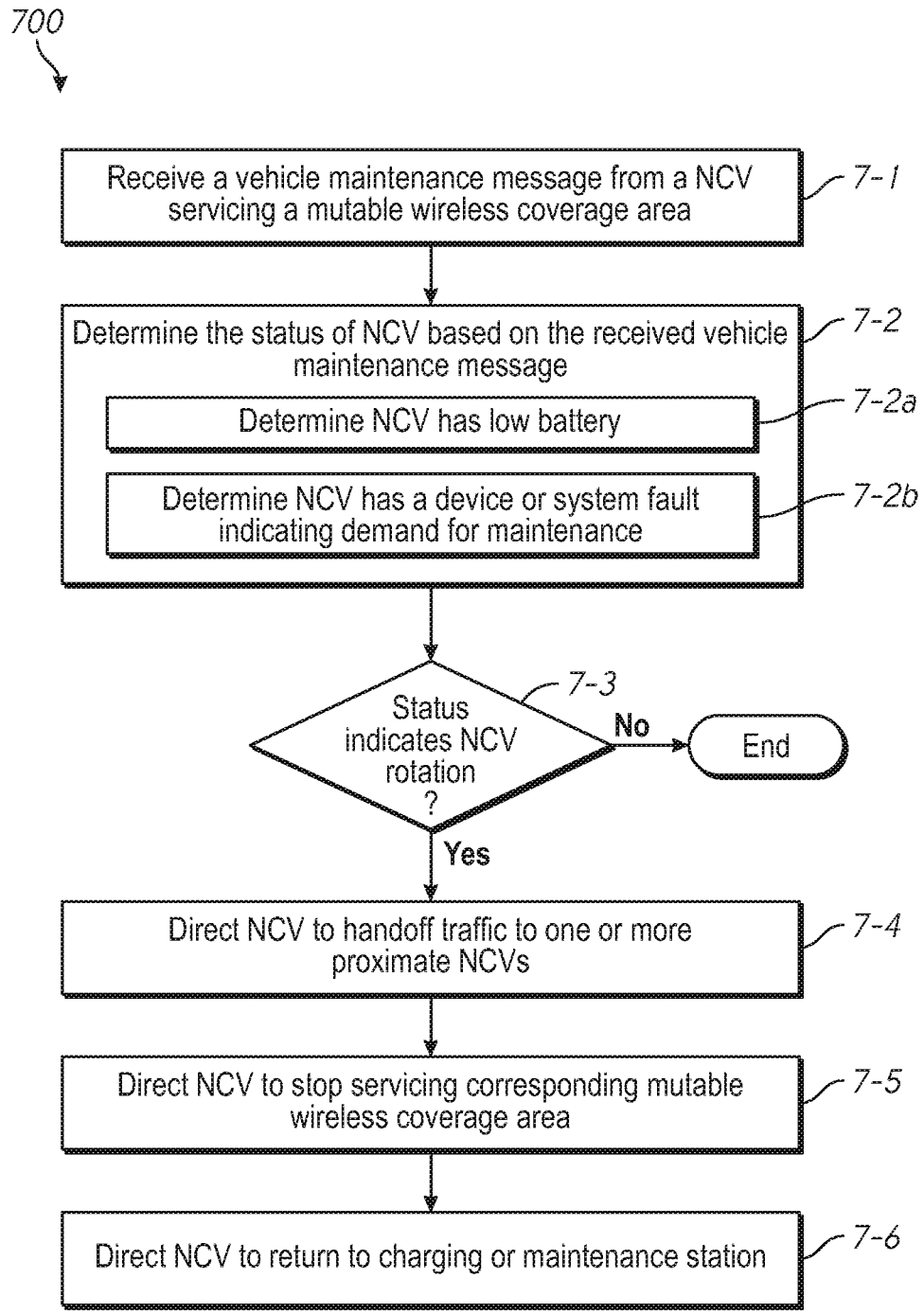
FIG. 7 is a flowchart representation of another method of provisioning and transforming mutable wireless coverage areas within a mutable service area in accordance with some implementations.
Figure 8:
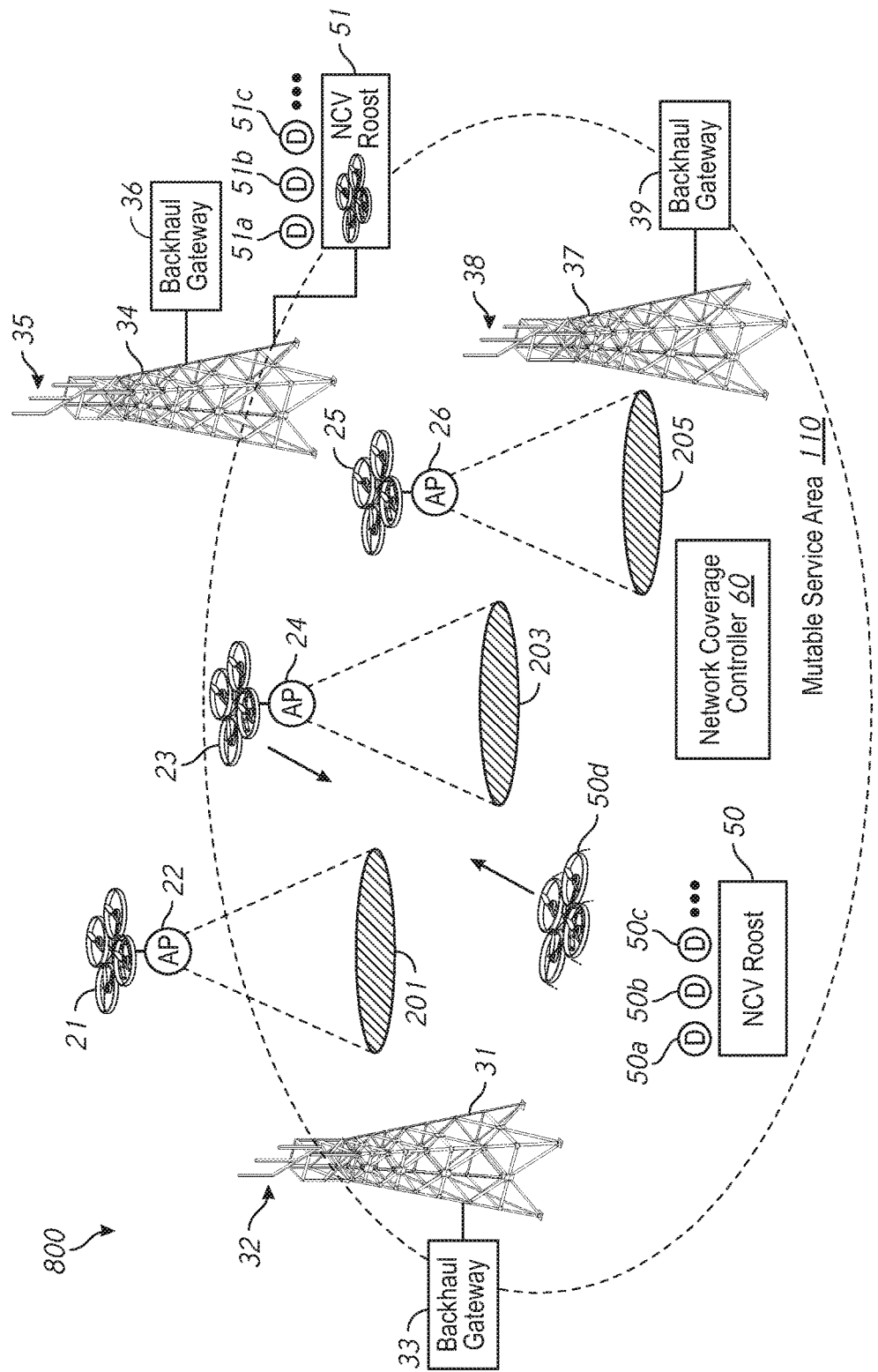
FIG. 8 is an illustration of the data networking environment adapted from FIG. 1 in accordance with some implementations.

FIG. 7 is a flowchart representation of a method 700 of provisioning and transforming mutable wireless coverage areas within a service area in accordance with some implementations. In various implementations, the method 700 is performed by a network coverage controller (e.g., the network coverage controller 60 of FIG. 1) configured to transform mutable wireless coverage areas provided by NCVs (e.g., the NCVs 21, 23, 25 of FIG. 1). Those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 700 are described herein with reference to FIG. 8. Data networking environment 800 shown in FIG. 8 is similar to and adapted from the data networking environment 100 shown in FIG. 1. Elements common to FIGS. 1 and 8 include common reference numbers, and only the differences between FIGS. 1 and 8 are described herein for the sake of brevity.

Briefly, the method 700 includes determining a maintenance condition of a NCV that services a first mutable wireless coverage area, and changing how the first mutable wireless coverage area is serviced in response to determining the maintenance condition. In various implementations, the NCV is one of a number of NCVs deployed in a service area, and each of the NCVs is tasked with servicing a corresponding mutable wireless coverage area within the service area. In various implementations, the maintenance condition includes a status characterization of the operating condition of at least one component of the NCV, such as a battery or energy level monitor, a motor, a navigation system, and the respective AP carried by the NCV.

To that end, as represented by block 7-1, in some implementations the method 700 includes receiving a NCV maintenance message from a NCV servicing a mutable wireless coverage area. For example, with reference to FIG. 8, the network coverage controller NCV 23 receives a NCV maintenance message from the NCV 23. As represented by block 7-2, in some implementations the method 800 includes determining the status of the reporting NCV based on the NCV maintenance message. In some implementations, as represented by block 7-2a, determining the status of the reporting NCV includes determining that the reporting NCV has a battery level below a low-power threshold, which indicates recharging the NCV battery is desirable for continued safe operation in a populated event space. In some implementations, as represented by block 7-2b, determining the status of the reporting NCV includes determining that the reporting NCV has a mechanical fault and/or control-system fault, which indicates that maintenance is desirable for continued safe operation in a populated event space.

As represented by block 7-3, in some implementations the method 700 includes determining whether or not NCV rotation is desirable for continued safe operation in a crowded space. In other words, the method 700 includes determining whether or not it is desirable for the reporting NCV to be replaced by newly deploying another NCV and/or handing-off traffic from the reporting NCV to one or more already deployed NCVs. If NCV rotation is not desirable or required because of a critical state of the reporting NCV ("No" path from block 7-3), the method ends (or circles back to the portion of the method represented by block 7-1). On the other hand, if NCV rotation is desirable or required because of a critical state of the reporting NCV ("Yes" path from block 7-3), as represented by block 7-4, in some implementations the method 700 includes directing the reporting NCV to handoff the traffic that the reporting NCV is handling to one or more proximate NCVs. Continuing the example, if the NCV maintenance message from the NCV 23 indicates a low battery level and/or another maintenance condition for which maintenance is desirable, the network coverage controller 60 directs the NCV 23 to handoff traffic to one or both the NCVs 21, 25. Additionally and/or alternatively, in some implementations, directing the reporting NCV to handoff the traffic to another NCV also includes deploying a new NCV proximate to the mutable wireless coverage area provided by the reporting NCV. In turn, the reporting NCV can handoff servicing of the mutable wireless coverage area to the newly deployed NCV. For example, with reference to FIG. 8, the network coverage controller 60 directs NCV 50c to a position proximate to the mutable wireless coverage area 203 provided by NCV 23, and further directs the NCV 23 to handoff traffic to the newly deployed NCV 50c as described above with reference to FIG. 3.

As represented by block 7-5, in some implementations the method 700 includes directing the reporting NCV to stop servicing the selected mutable wireless coverage area. As represented by block 7-6, in some implementations the method 700 includes directing the NCV to return to a charging station and/or a maintenance station (e.g., a NCV roost). For example, with reference to FIG. 8, the network coverage controller 60 directs the NCV 23 to handoff traffic to NCVs 21, 25 and/or to a newly deployed NCV 50*c*, and then return to the NCV roost 50.

Figure 9:
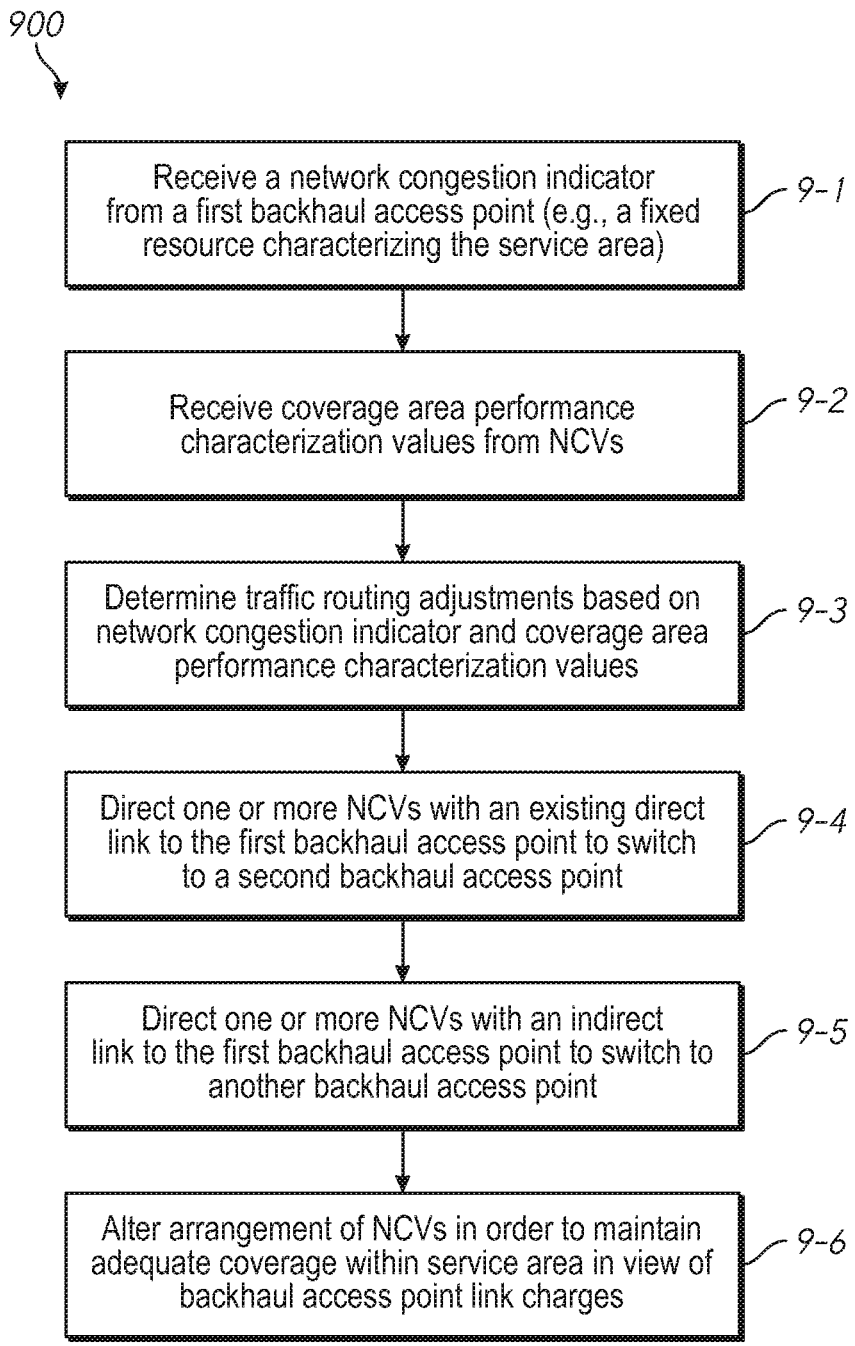
FIG. 9 is a flowchart representation of another method of provisioning and transforming mutable wireless coverage areas within a mutable service area in accordance with some implementations.

FIG. 9 is a flowchart representation of a method 900 of provisioning and transforming mutable wireless coverage areas within a service area in accordance with some implementations. In various implementations, the method 900 is performed by a network coverage controller (e.g., the network coverage controller 60 of FIG. 1) configured to transform mutable wireless coverage areas provided by NCVs (e.g., the NCVs 21, 23, 25 of FIG. 1). Those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 900 are described herein with reference to FIG. 1. Briefly, the method 900 includes receiving a congestion indicator from a backhaul AP that is servicing traffic for a number of NCVs, determining traffic routing adjustments in order to alleviate congestion at the backhaul AP, and altering the arrangement of the NCVs based on the backhaul access point routing changes.

To that end, as represented by block 9-1, in some implementations the method 900 includes receiving a network congestion indicator from a first backhaul AP. For example, with reference to FIG. 1, the network coverage controller 60 receives a congestion indicator from the backhaul gateway node 33 (or backhaul AP 32), which is servicing traffic from both the NCV 21 and the NCV 23. In some operation examples, both of the NCVs 21, 23 have direct links to the backhaul gateway node 33 through the respective backhaul AP 32 mounted on the access point tower 31. In some operation examples, one of the NCVs 21, 23 provides an indirect link to the backhaul gateway node 33 by functioning as a repeater for the other. For example, the NCV 21 has a direct link to the backhaul gateway node 33, but the NCV 23 does not—and as such, in operation, the NCV 21 routes traffic between the backhaul gateway node 33 and the NCV 23.

As represented by block 9-2, in some implementations the method 900 includes receiving coverage area performance characterization values from the NCVs deployed within the service area. For example, with reference to FIG. 1, the network coverage controller 60 receives one or more coverage area performance characterization values from each of NCVs 21, 23, 25 which respectively provide the mutable wireless coverage areas 201, 203, 205.

As represented by block 9-3, in some implementations the method 900 includes determining traffic routing adjustments based on the network congestion indicator and the coverage area performance characterization values from NCVs. Continuing the example, with reference to FIG. 1, in response to receiving the congestion indicator from the backhaul gateway node 33, the network coverage controller 60 determines how and where to reroute traffic from the NCVs 21, 23 in order to alleviate congestion at the backhaul gateway node 33. Those of ordinary skill in the art will appreciate that there are numerous ways of rerouting traffic in order to alleviate congestion, and thus an exhaustive description of the various methods is not provided herein for the sake of brevity.

As represented by block 9-4, in some implementations the method 900 includes directing one or more NCVs with an existing direct link to the first backhaul access point to switch to a second backhaul access point in order to alleviate congestion at the first backhaul access point. For example, if the NCV 23 has a direct link to the backhaul gateway node 33, the network coverage controller directs the NCV 23 to establish a link (directly or indirectly) to backhaul gateway node 36, and to cease using the backhaul gateway node 33.

As represented by block 9-5, in some implementations the method 900 includes directing one or more NCVs with an existing indirect link to the first backhaul access point to switch to a second backhaul access point in order to alleviate congestion at the first backhaul access point. For example, if the NCV 23 has an indirect link to the backhaul gateway node 33, the network coverage controller direct the NCV 23 to establish a link (directly or indirectly) to backhaul gateway node 36, and to cease using the backhaul gateway node 33. Additionally and/or alternatively, the network coverage controller 60 determines how to spread traffic to one or more of the other backhaul gateway nodes 36, 39. In one example, the network coverage controller 60 directs one or both of the backhaul gateway nodes 36, 39 to take on a share of the traffic from both the NCVs 21, 23. In another example, the network coverage controller 60 directs one of the backhaul gateway nodes 36, 39 to service substantially all of the traffic for the NCV 23, so that the NCV 23 can stop using the backhaul gateway node 33. To that end, in one example, the NCV 23 establishes an indirect link to backhaul gateway node 39 through NCV 25.

As represented by block 9-6, in some implementations the method 900 includes altering the arrangement of the NCVs in order to maintain adequate coverage within the service area based on the backhaul access point routing link changes. For example, in some instances, routing changes may be better effectuated by repositioning one or more of the NCVs. To that end, the network coverage controller 60 generates navigation updates for a corresponding one or more NCVs. In various implementations, the navigation updates are generated in order to reposition one or more NCVs so that service performance metrics are maintained, improved or tolerably degraded based on the backhaul access point routing link changes.

Figure 10:
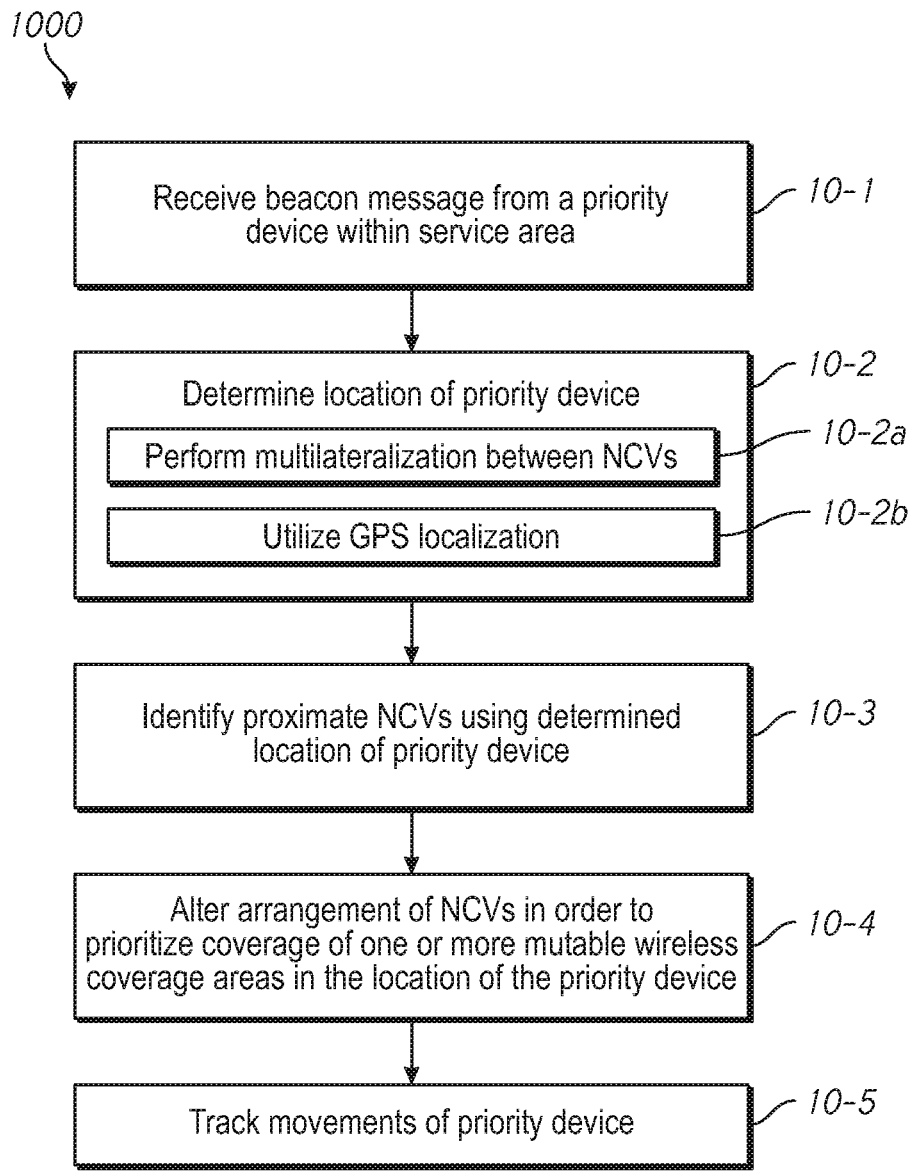
FIG. 10 is a flowchart representation of another method of provisioning and transforming mutable wireless coverage areas within a mutable service area in accordance with some implementations.
Figure 11A:
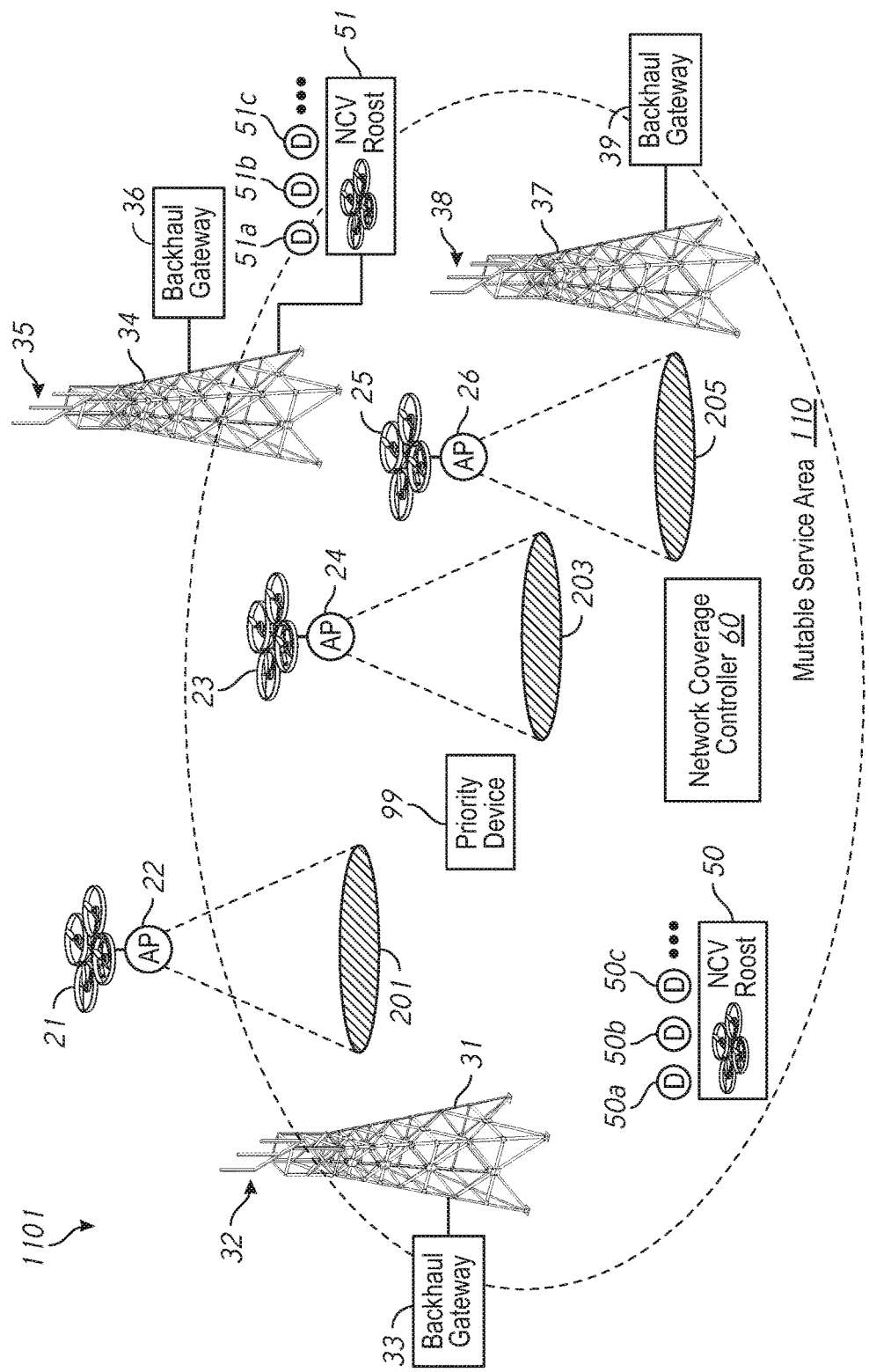
FIGS. 11A and 11B are illustrations of the data networking environment adapted from FIG. 1 in accordance with some implementations.
Figure 11B:
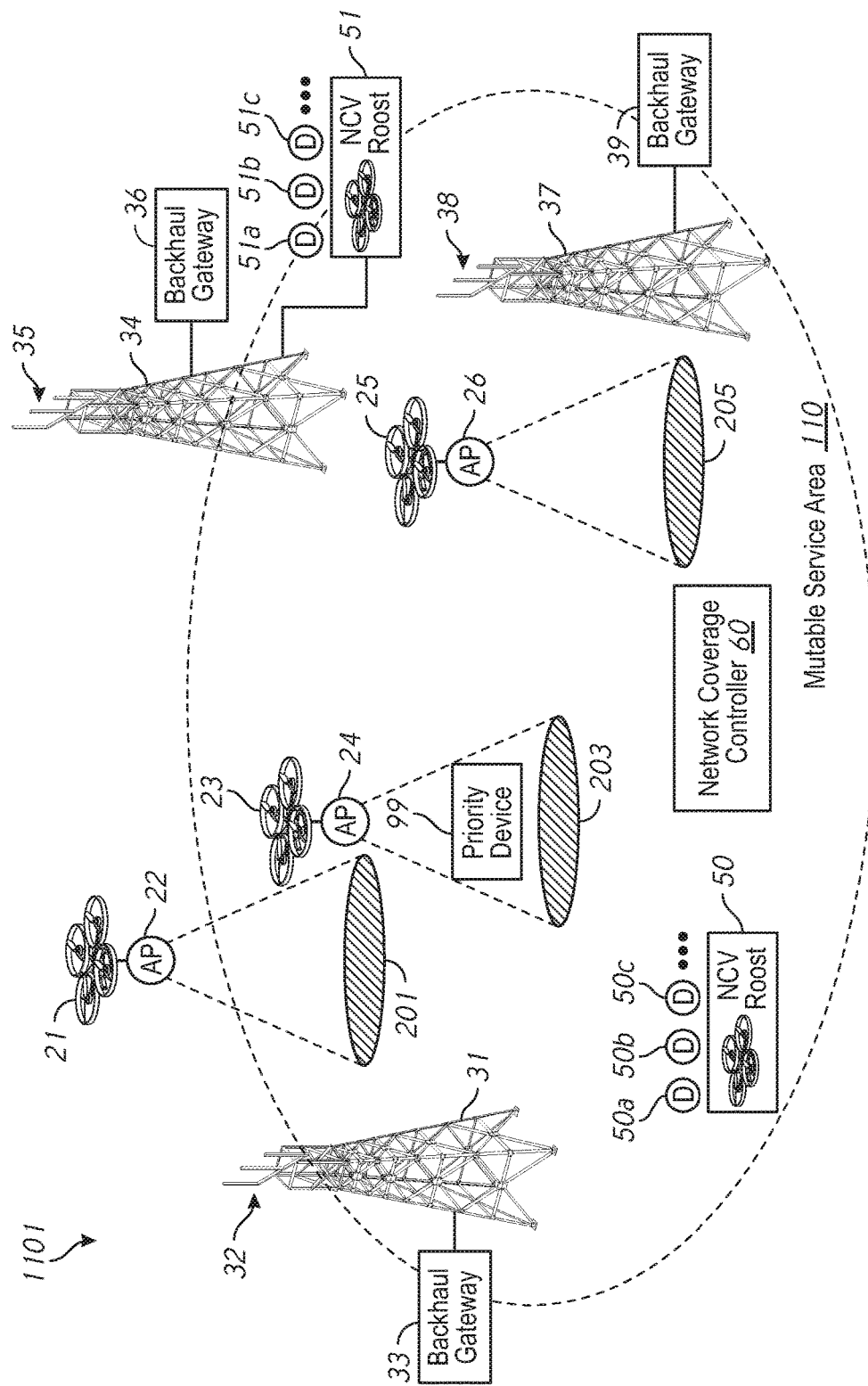

FIG. 10 is a flowchart representation of a method 1000 of provisioning and transforming mutable wireless coverage areas within a service area in accordance with some implementations. In various implementations, the method 1000 is performed by a network coverage controller (e.g., the network coverage controller 60 of FIG. 1) configured to transform mutable wireless coverage areas provided by NCVs (e.g., the NCVs 21, 23, 25 of FIG. 1). Those of ordinary skill in the art will appreciate from the present disclosure that a respective AP carried by a NCV provides network access to client devices and communicates with backhaul APs, and that merely for the sake of brevity the combination of a NCV and a respective AP is collectively referred to as a NCV. Examples associated with the method 1000 are described herein with reference to FIGS. 11A and 11B. Data networking environment 1100 shown in FIGS. 11A and 11B is similar to and adapted from the data networking environment 100 shown in FIG. 1. Elements common to FIGS. 1, 11A and 11B include common reference numbers, and only the differences between FIGS. 1, 11A and 11B are described herein for the sake of brevity.

Briefly, the method 1000 includes receiving a beacon message from a priority device (e.g., an emergency transponder, a known client device associated with emergency response personnel and/or security, etc.), determining the location of the priority device, and altering the arrangement of the NCVs in order to prioritize network access for the priority device. To that end, as represented by block 10-1, in some implementations the method 1000 includes receiving a beacon message from a priority device within a service area. For example, with reference to FIG. 11A, the network coverage controller 60 receives a beacon message from priority device 99. In various implementations, a beacon message receives special handling by NCVs that receive it. In various implementations, the priority device 99 does not have to have a pre-established with any one of the NCVs 21, 23, 25 deployed in the service area 110. In some implementations, the priority device 99 transmits the beacon message on a dedicated channel with a high transmission power level so that the beacon message can be received by as many deployed NCVs as possible. In various implementations, the beacon message includes a unique identifier particular to the priority device 99 so that beacon messages from the priority device 99 can be distinguished from beacon message from one or more other priority devices. In some implementations, the priority device 99 transmits the beacon message on one or more WiFi channels with a high transmission power level so that the beacon message can be received by as many deployed NCVs as possible. In some implementations, the priority device 99 is permitted to transmit at a high enough level to be able to effectively drown out respective uplink signals from client devices received by at least some of the NCVs because the beacon message is intended for use in emergency and/or situations in which the priority device is provided priority over other non-priority or nominal client devices.

As represented by block 10-2, in some implementations the method 1000 includes determining the location of the priority device. As represented by block 10-2a, in various implementations, determining the location of the priority device includes performing multilateralization using respective copies of beacon message received by one or more NCVs. For example, the network coverage controller 60 performs multilateralization in order to determine the location of the priority device 99 in response to each of the NCVs 21, 23, 25 receiving a copy of the beacon message from the priority device 99 and the NCVs, in turn, reporting that reception to the network coverage controller 60. In another example, the network coverage controller 60 performs a limited form of multilateralization in response to a single NCV receiving a beacon message. For example, if the NCV 21 is the only NCV to receive and report reception of a beacon message from the priority device 99, the network coverage controller 60 directs the NCV 21 to estimate the direction from which the beacon message was received and move in that direction in order to attempt to receive the beacon message again. In some implementations, the network coverage controller 60 also directs one or more of the other NCVs 23, 25 towards the NCV 21 in order to increase the possibility that the NCVs 23, 25 also receive subsequent beacon messages from the priority device 99. As represented by block 10-2b, in various implementations, determining the location of the priority device includes utilizing GPS localization. For example, in some implementations, the priority device 99 includes a GPS unit, and transmits GPS coordinates associated with the beacon message. In turn, one or more receiving NCVs provide the GPS coordinates to the network coverage controller 60. In some implementations, the network coverage controller 60 uses data beacone messages to construct an emergency report, which can then be sent to first responders or other authorities with responsibility for the mutable service area 110.

As represented by block 10-3, in some implementations the method 1000 includes identifying proximate NCVs using the determined location of the priority device. For example, with reference to FIG. 11A, the network coverage controller 60 determines that the NCVs 21, 23 are proximate to the priority device 99, even though NCV 25 also received the beacon message from the priority device 99. In some implementations, determining proximate NCVs includes identifying one or more NCVs that are within a threshold distance to the priority device—such as the one or two closest NCVs to the priority device.

As represented by block 10-4, in some implementations the method 1000 includes altering the arrangement of the NCVs deployed in a service area in order to prioritize coverage of one or more mutable wireless coverage areas in the location of the priority device. Continuing the example, with reference to FIG. 11B, the network coverage controller 60 directs the NCV 23 to cover an area that includes the priority device 99 with mutable wireless coverage area 203. In some implementations, altering the arrangement of the plurality of NCVs in order to prioritize access for or proximate to the priority device in response to receiving the beacon includes directing a first one of the plurality of NCVs to provide a first mutable wireless coverage area that includes the location of the priority device within the service area. As represented by block 10-5, in some implementations the method 1000 includes tracking the movements of the priority device. In other words, the method includes updating the arrangement of the NCVs in order to prioritize network access for the priority device by reposition the NCVs in order to provide network coverage that satisfies a particular priority performance metric for the priority device.

Figure 12:
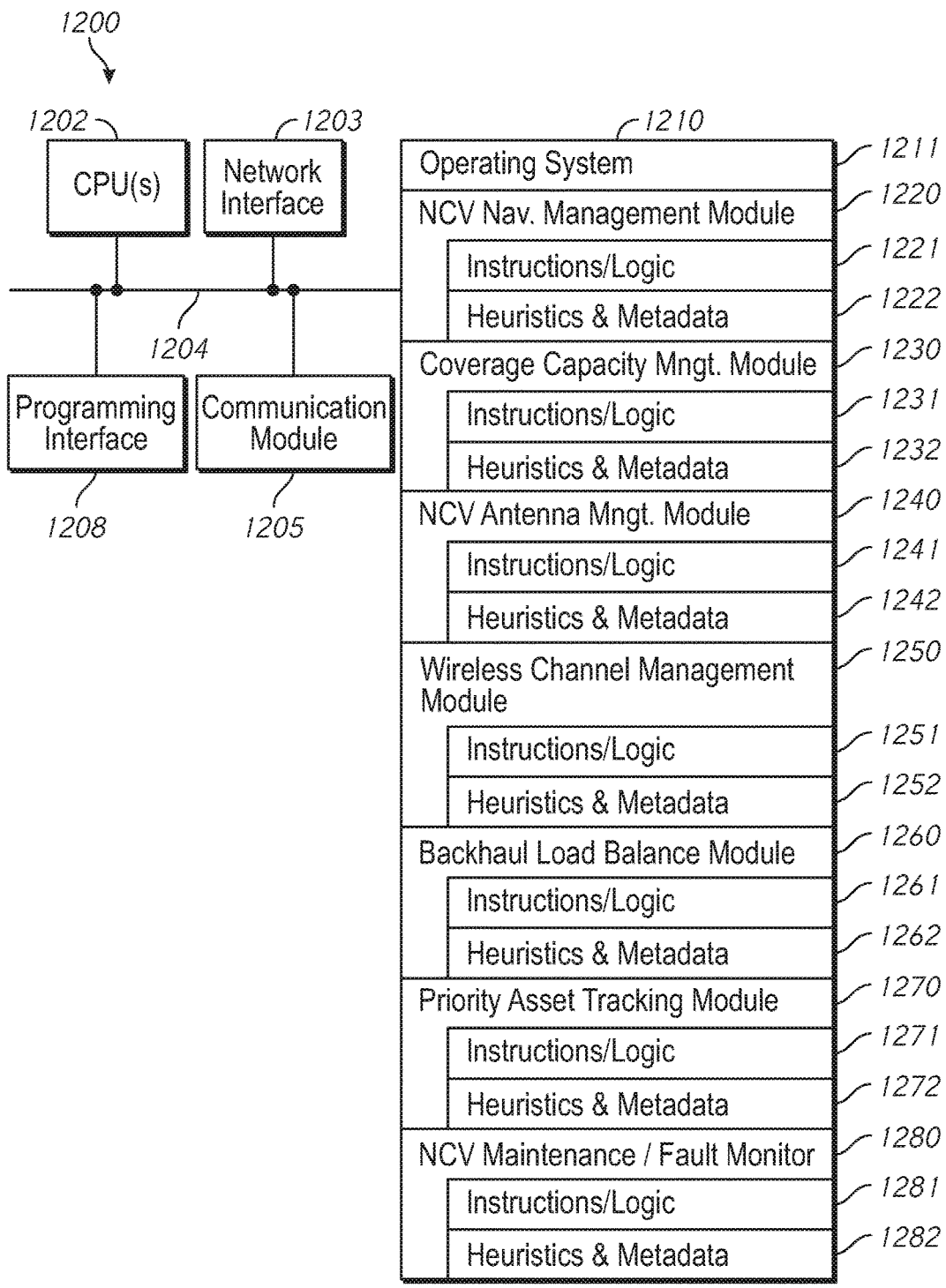
FIG. 12 is a block diagram of a network coverage controller in accordance with some implementations.

FIG. 12 is a block diagram of a network coverage controller 1200 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the network coverage controller 1200 includes one or more processing units (CPU's) 1202, one or more network interfaces 1203, a memory 1210, a programming interface 1208, a communications module 1205, and one or more communication buses 1204 or interconnecting these and various other components.

In some implementations, the one or more network interface 1203 and the communication module 1205 are provided to, among other uses, establish and maintain communication channels with backhaul gateway nodes and backhaul APs, and control tunnels to NCVs through backhaul APs. For example, a network coverage controller establishes and maintains communication channels with backhaul gateway nodes and backhaul. Continuing the example, the network coverage controller establishes control tunnels to NCVs in a service area through backhaul APs. In various implementations, a control tunnel is a prioritized communication channels between the network coverage controller and a respective NCV through a backhaul AP and one or more other NCVs. A NCV uses a respective control tunnel to provide, among other messages, coverage area performance characterization values and maintenance messages to the network coverage controller. The network coverage controller uses the control tunnel to respond and direct the NCV with NCV operation adjustments. To that end, in some implementations, control tunnel packets are marked and/or contain header fields that enable the prioritization of control tunnel packets by backhaul APs and NCVs. In some implementations, the prioritization of control tunnel packets includes the use of dedicated routing paths between NCVs and the network coverage controller. In some implementations, the prioritization of control tunnel packets includes bandwidth reservations.

In some implementations, the communication buses 1204 include circuitry that interconnects and controls communications between system components. The memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1210 optionally includes one or more storage devices remotely located from the CPU(s) 1202. The memory 1210 comprises a non-transitory computer readable storage medium.

In some implementations, the memory 1210 or the non-transitory computer readable storage medium of the memory 1210 stores the following programs, modules and data structures, or a subset thereof including an optional operating system 1211, a NCV navigation management module 1220, a coverage capacity management module 1230, a NCV antenna management module 1240, a wireless channel management module 1250, a backhaul load balance module 1260, a priority asset tracking management module 1270, and a NCV maintenance (fault) monitor module 1280.

The operating system 1211 includes procedures for handling various basic system services and for performing hardware dependent tasks.

In some implementations, the NCV navigation management module 1220 is configured to generate a respective set of navigation updates for at least one of the plurality of NCVs. The respective set of navigation updates includes instructions directing a corresponding one of the plurality of NCVs to a new position in order to alter the arrangement of one or more the mutable wireless coverage areas within the service area. To that end, in various implementations, the NCV navigation management module 1220 includes instructions and/or logic 1221, and heuristics and metadata 1222.

In some implementations, the coverage capacity management module 1230 is configured to determine whether bandwidth provided a NCV is underutilized or breaches capacity threshold level (indicating high demand), and suggest repositioning of one of more NCVs in order to satisfy one or more performance metrics. To that end, in various implementations, the coverage capacity management module 1230 includes instructions and/or logic 1231, and heuristics and metadata 1232.

In some implementations, the NCV antenna management module 1240 is configured to generate antenna operation adjustments for at least one of the plurality of NCVs. In various implementations, the antenna operation adjustments include a combination of one or more of an antenna transmission power control adjustment, an antenna repositioning adjustment, enabling the use of an additional antenna, and disabling the use of an antenna currently in use in order to alter arrangement of one or more the mutable wireless coverage areas within the service area. To that end, in various implementations, the NCV antenna management module 1240 includes instructions and/or logic 1241, and heuristics and metadata 1242.

In some implementations, the wireless channel management module 1250 is configured to evaluate channel quality and/or signal quality associated with wireless links to and/or from a NCV within a particular mutable wireless coverage area, and suggest repositioning of one of more NCVs in order to satisfy one or more performance metrics. To that end, in various implementations, the wireless channel management module 1250 includes instructions and/or logic 1251, and heuristics and metadata 1252.

In some implementations, the backhaul load balance module 1260 is configured to determine traffic routing adjustments in order to alleviate congestion at the backhaul APs, and suggest altering the arrangement of NCVs based on the backhaul access point routing changes. To that end, in various implementations, the backhaul load balance module 1260 includes instructions and/or logic 1261, and heuristics and metadata 1262.

In some implementations, the priority asset tracking management module 1270 is configured to determine the location of a priority device based on one or more copies of a beacon message received by NCVs and reported to the network coverage controller 1200, and suggest altering the arrangement of the NCVs in order to prioritize network access for the priority device. To that end, in various implementations, the priority asset tracking management module 1270 includes instructions and/or logic 1271, and heuristics and metadata 1272.

In some implementations, the NCV maintenance (fault) monitor module 1280 is configured to determine a maintenance condition of a NCV that services a first mutable wireless coverage area, and change how the first mutable wireless coverage area is serviced in response to determining the maintenance condition. In various implementations, the NCV is one of a number of NCVs deployed in a service area, and each of the NCVs is tasked with servicing a corresponding mutable wireless coverage area within the service area. In various implementations, the maintenance condition includes a status characterization of the operating condition of at least one component of the NCV, such as a battery, a motor, a navigation system, and the respective AP carried by the NCV. To that end, in various implementations, the NCV maintenance (fault) monitor module 1280 includes instructions and/or logic 1281, and heuristics and metadata 1282.

FIG. 13 is a block diagram of a network coverage vehicle (NCV) 1300 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the NCV 1300 includes one or more processing units (CPU's) 1302, a network interface 1303, a communications module 1305, a memory 1310, a programming interface 1308, a WiFi AP 1309 and one or more communication buses 1304 or interconnecting these and various other components.

In some implementations, the network interface 1303 and the communication module 1305 are provided to, among other uses, establish and maintain communication channels with backhaul gateway nodes and backhaul APs, and control tunnels to a network coverage controller through backhaul APs. The onboard WiFi AP 1309 is coupled to the network interface 1303 and the communication module 1305, and is configured to provide wireless network access to client devices within a respective mutable wireless coverage area.

In some implementations, the communication buses 1304 include circuitry that interconnects and controls communications between system components. The memory 1310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1310 optionally includes one or more storage devices remotely located from the CPU(s) 1302. The memory 1310 comprises a non-transitory computer readable storage medium.

In some implementations, the memory 1310 or the non-transitory computer readable storage medium of the memory 1310 stores the following programs, modules and data structures, or a subset thereof including an optional operating system 1311, a directed navigation module 1320, a battery monitor module 1330, a mechanical fault detection module 1340, and coverage area control module 1350.

The operating system 1311 includes procedures for handling various basic system services and for performing hardware dependent tasks.

In some implementations, the directed navigation module 1320 is configured to effectuate navigation updates received from a network coverage controller. To that end, in various implementations, the directed navigation module 1320 includes instructions and/or logic 1321, and heuristics and metadata 1322.

In some implementations, the battery monitor module 1330 is configured to assess the state of the onboard battery (or batteries) that power the NCV, and report breaches of a low-power threshold. To that end, in various implementations, the battery monitor module 1330 includes instructions and/or logic 1331, and heuristics and metadata 1332.

In some implementations, the mechanical fault detection module 1340 is configured to assess the mechanical systems and/or control-systems of the NCV, and report detections of faults for which maintenance is desirable for continued safe operation in a populated event space. To that end, in various implementations, the mechanical fault detection module 1340 includes instructions and/or logic 1341, and heuristics and metadata 1342.

In some implementations, the coverage area control module 1350 is configured to manage the provisioning of wireless network access within a respective mutable wireless coverage area provided by the WiFi AP 1309 of the NCV 1300. To that end, in various implementations, the coverage area control module 1350 includes an antenna control module 1360, a power control module 1370, a client traffic control module 1380, and a backhaul access module 1390.

In some implementations, the antenna control module 1360 is configured to effectuate antenna operation adjustments received from a network coverage controller, and provide feedback concerning the operation of one or more antennas included with the WiFi AP 1309. To that end, in various implementations, the antenna control module 1360 includes instructions and/or logic 1361, and heuristics and metadata 1362.

In some implementations, the power control module 1370 is configured to manage the transmission power of the WiFi AP 1309. To that end, in various implementations, the power control module 1370 includes instructions and/or logic 1371, and heuristics and metadata 1372.

In some implementations, the client traffic control module 1380 is configured to manage client traffic channels to and from the WiFi AP 1309 and one or more backhaul APs. To that end, in various implementations, the client traffic control module 1380 includes instructions and/or logic 1381, and heuristics and metadata 1382.

In some implementations, the backhaul access module 1390 is configured to effectuate traffic routing adjustments in order to alleviate congestion at the backhaul APs. To that end, in various implementations, the backhaul access module 1390 includes instructions and/or logic 1391, and heuristics and metadata 1392.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a network coverage controller including a non-transitory memory, one or more processors, and various network interfaces:
selecting, from mutable wireless coverage areas provided by network coverage vehicles (NCVs), a particular one of the mutable wireless coverage areas associated with at least a subset of the NCVs, wherein the subset of the NCVs is a plurality;

determining whether or not respective coverage area performance characterization values received from the subset of the NCVs satisfy one or more corresponding thresholds;

in response to determining that the respective coverage area performance characterization values received from the subset of the NCVs satisfy the one or more corresponding thresholds, providing navigation updates to the subset of the NCV s in order to reposition the subset of the NCVs; and in response to determining that the respective coverage area performance characterization values do not satisfy the one or more corresponding thresholds:

foregoing providing the navigation updates to the subset of the NCVs, and selecting a different mutable wireless coverage area associated with at least a different subset of the NCVs.

2. The method of claim 1, wherein each of the respective coverage area performance characterization values includes a value that characterizes a corresponding wireless channel condition associated with a NCV within the particular one of the mutable wireless coverage areas.

3. The method of claim 1, wherein each of the respective coverage area performance characterization values includes a value that characterizes a corresponding data traffic condition associated with a NCV within the particular one of the mutable wireless coverage areas.

4. The method of claim 1, wherein the respective coverage area performance characterization values include one or more of: interference values in the particular one of the mutable wireless coverage areas, signal fading values in the particular one of the mutable wireless coverage areas, or signal-to-noise (SNR) ratio values in the particular one of the mutable wireless coverage areas.

5. The method of claim 1, further comprising, in response to determining that the respective coverage area performance characterization values do not satisfy the one or more corresponding thresholds further includes:

determining whether or not respective coverage area performance characterization values received from the different subset of the NCVs satisfy one or more corresponding thresholds; and in response to determining that the respective coverage area performance characterization values received from the different subset of the NCVs satisfy the one or more corresponding thresholds, providing additional navigation updates to the different subset of the NCVs in order to reposition the different subset of the NCVs.

6. The method of claim 1, wherein providing the navigation updates includes determining NCV operation adjustments.

7. The method of claim 6, wherein determining the NCV operation adjustments includes generating a respective set of navigation updates for the subset of the NCVs, wherein the respective set of navigation updates includes instructions directing a corresponding one of subset of the NCVs to a new position in order to alter the particular one of the mutable wireless coverage areas associated with the subset of the NCVs.

8. The method of claim 6, wherein determining the NCV operation adjustments includes generating antenna operation adjustments for the subset of the NCVs, wherein the antenna operation adjustments include a combination of one or more of an antenna transmission power control adjustment, an antenna repositioning adjustment, enabling the use of an additional antenna, and disabling the use of an antenna currently in use in order to alter the particular one of the mutable wireless coverage areas associated with the subset of the NCVs.

9. The method of claim 6, wherein determining the NCV operation adjustments includes:

determining that a data traffic demand within the particular one of the mutable wireless coverage areas, that is serviced by a first one of the subset of the NCVs, breaches a threshold based on the respective coverage area performance characterization values; and changing how the particular one of the mutable wireless coverage areas is serviced in response to determining the breach.

10. The method of claim 9, wherein changing how the particular one of the mutable wireless coverage areas is serviced includes deploying a new NCV to a respective portion of the service area proximate to the first one of the subset of the NCVs.

11. The method of claim 10, wherein the new NCV includes a respective access point with a different antenna configuration than the first one of the subset of the NCVs.

12. The method of claim 10, wherein changing how the particular one of the mutable wireless coverage areas is serviced includes directing the first one of the subset of the NCV s and the new NCV to cooperatively service the particular one of the mutable wireless coverage areas by splitting the particular one of the mutable wireless coverage areas into two new mutable coverage areas.

13. A network coverage controller comprising: various network interfaces, one or more processors, and a non-transitory memory including instructions, which, when executed by the one or more processors, cause the network coverage controller to:

select, from mutable wireless coverage areas provided by network coverage vehicles (NCVs), a particular one of the mutable wireless coverage areas associated with at least a subset of the NCVs;

determine whether or not respective coverage area performance characterization values received from the subset of the NCVs satisfy one or more corresponding thresholds;

in response to determining that the respective coverage area performance characterization values received from the subset of the NCVs satisfy the one or more corresponding thresholds, provide navigation updates to the subset of the NCVs in order to reposition the subset of the NCVs; and in response to determining that the respective coverage area performance characterization values do not satisfy the one or more corresponding thresholds:

forgo providing the navigation updates to the subset of the NCVs, and select a different mutable wireless coverage area associated with at least a different subset of the NCVs.

14. The network coverage controller of claim 13, wherein the respective coverage area performance characterization values include one or more of: interference values in the particular one of the mutable wireless coverage areas, signal fading values in the particular one of the mutable wireless coverage areas, or signal-to-noise (SNR) ratio values in the particular one of the mutable wireless coverage areas.

15. The network coverage controller of claim 13, wherein the non-transitory memory includes additional instructions that cause the network coverage controller to:

in further response to determining that the respective coverage area performance characterization values do not satisfy the one or more corresponding thresholds:
determine whether or not respective coverage area performance characterization values received from the different subset of the NCVs satisfy one or more corresponding thresholds; and
in response to determining that the respective coverage area performance characterization values received from the different subset of the NCVs satisfy the one or more corresponding thresholds, provide additional navigation updates to the different subset of the NCV s in order to reposition the different subset of the NCVs.

16. The network coverage controller of claim 13, wherein providing the navigation updates includes determining NCV operation adjustments.

17. The network coverage controller of claim 16, wherein determining the NCV operation adjustments includes generating a respective set of navigation updates for the subset of the NCVs, wherein the respective set of navigation updates includes instructions directing a corresponding one of subset of the NCV s to a new position in order to alter the particular one of the mutable wireless coverage areas associated with the subset of the NCVs.

18. The network coverage controller of claim 16, wherein determining the NCV operation adjustments includes generating antenna operation adjustments for the subset of the NCV s, wherein the antenna operation adjustments include a combination of one or more of an antenna transmission power control adjustment, an antenna repositioning adjustment, enabling the use of an additional antenna, and disabling the use of an antenna currently in use in order to alter the particular one of the mutable wireless coverage areas associated with the subset of the NCVs.

19. The network coverage controller of claim 16, wherein determining the NCV operation adjustments includes:
determining that a data traffic demand within the particular one of the mutable wireless coverage areas, that is serviced by a first one of the subset of the NCVs, breaches a threshold based on the respective coverage area performance characterization values; and
changing how the particular one of the mutable wireless coverage areas is serviced in response to determining the breach.

20. The network coverage controller of claim 19, wherein changing how the particular one of the mutable wireless coverage areas is serviced includes deploying a new NCV to a respective portion of the service area proximate to the first one of the subset of the NCVs.

\* \* \* \* \*

UNITED STATES PATENT AND TRADEMARK OFFICE
CERTIFICATE OF CORRECTION

PATENT NO. : 10,469,155 B2  
APPLICATION NO. : 16/053651  
DATED : November 5, 2019  
INVENTOR(S) : Joseph Michael Clarke et al.

Page 1 of 1

It is certified that error appears in the above-identified patent and that said Letters Patent is hereby corrected as shown below:

In the Specification

In Column 5, Line 66, please amend as shown:
mentations, as represented by block 2-1a, performing a site Signed and Sealed this
Twenty-fourth Day of November, 2020

Andrei Iancu
*Director of the United States Patent and Trademark Office*